(12) United States Patent
Sun et al.

(10) Patent No.: US 9,957,365 B2
(45) Date of Patent: May 1, 2018

(54) CELLULAR POLYMERIC MATERIAL

(71) Applicant: Berry Plastics Corporation, Evansville, IN (US)

(72) Inventors: David Dezhou Sun, Evansville, IN (US); John B Euler, Evansville, IN (US); Chris K Leser, Evansville, IN (US); Charles T Wallace, Evansville, IN (US)

(73) Assignee: Berry Plastics Corporation, Evansville, IN (US)

( * ) Notice: Subject to any disclaimer, the term of this patent is extended or adjusted under 35 U.S.C. 154(b) by 0 days. days.

(21) Appl. No.: 14/188,504

(22) Filed: Feb. 24, 2014

(65) Prior Publication Data
US 2014/0264139 A1 Sep. 18, 2014

Related U.S. Application Data

(60) Provisional application No. 61/779,951, filed on Mar. 13, 2013.

(51) Int. Cl.
*C08J 9/28* (2006.01)
*C08J 9/00* (2006.01)
*B29C 44/22* (2006.01)

(52) U.S. Cl.
CPC ............ *C08J 9/0061* (2013.01); *B29C 44/22* (2013.01); *C08J 2201/03* (2013.01); *C08J 2323/12* (2013.01); *C08J 2423/12* (2013.01)

(58) Field of Classification Search
CPC ..... B29C 44/22; C08J 9/0061; C08J 2201/03; C08J 2323/12; C08J 2423/12
See application file for complete search history.

(56) References Cited

U.S. PATENT DOCUMENTS

| | | |
|---|---|---|
| 1,396,282 A | 11/1921 | Penn |
| 1,435,120 A | 11/1922 | Holman |
| 1,920,529 A | 8/1933 | Sidebotham |
| 1,969,030 A | 8/1934 | Page |
| 2,097,899 A | 11/1937 | Smith |
| 2,103,831 A | 12/1937 | Sidon |
| 2,809,776 A | 10/1957 | Barrington |
| 3,221,954 A | 12/1965 | Lux |
| 3,227,784 A | 1/1966 | Blades |
| 3,252,387 A | 5/1966 | Schur |
| 3,290,198 A | 12/1966 | Lux |
| 3,312,383 A | 4/1967 | Shapiro |
| 3,327,038 A | 6/1967 | Fox |
| 3,327,103 A | 6/1967 | Bonnet |
| 3,344,222 A | 9/1967 | Shapiro |
| 3,381,880 A | 5/1968 | Lewallen et al. |
| 3,409,204 A | 11/1968 | Carle |
| 3,431,163 A | 3/1969 | Gilbert |
| 3,443,715 A | 5/1969 | Edwards |
| 3,468,467 A | 9/1969 | Amberg |
| 3,547,012 A | 12/1970 | Amberg |
| 3,583,624 A | 6/1971 | Peacock |
| 3,658,615 A | 4/1972 | Amberg |
| 3,661,282 A | 5/1972 | Buhayar |
| 3,733,381 A | 5/1973 | Willette |
| 3,793,283 A | 2/1974 | Frailey |
| 3,846,349 A | 11/1974 | Harada |
| 3,907,193 A | 9/1975 | Heller |
| 3,919,368 A | 11/1975 | Seto |
| RE28,658 E | 12/1975 | MacDaniel |
| 3,967,991 A | 7/1976 | Shimano |
| 3,969,173 A | 7/1976 | Amberg |
| 3,971,696 A | 7/1976 | Manfredi |
| 3,973,721 A | 8/1976 | Nakane |
| 3,981,412 A | 9/1976 | Asmus |
| 4,026,458 A | 5/1977 | Morris |
| 4,049,122 A | 9/1977 | Maxwell |
| 4,070,513 A | 1/1978 | Rhoads |
| 4,106,397 A | 8/1978 | Amberg |
| 4,171,085 A | 10/1979 | Doty |
| 4,197,948 A | 4/1980 | Amberg |
| 4,240,568 A | 12/1980 | Pool |
| 4,284,226 A | 8/1981 | Herbst |
| 4,288,026 A | 9/1981 | Wilhelm |
| 4,298,331 A | 11/1981 | Mueller |
| 4,299,349 A | 11/1981 | Gilden |
| 4,300,891 A | 11/1981 | Bemiss |
| 4,306,849 A | 12/1981 | Cress |
| 4,310,369 A | 1/1982 | Miller |
| 4,349,400 A | 9/1982 | Gilden |
| 4,365,460 A | 12/1982 | Cress |
| 4,391,666 A | 7/1983 | Mueller |
| 4,409,045 A | 10/1983 | Busse |
| 4,490,130 A | 12/1984 | Konzal |

(Continued)

FOREIGN PATENT DOCUMENTS

| CA | 2291607 | 6/2000 |
|---|---|---|
| CA | 2765489 | 12/2010 |

(Continued)

OTHER PUBLICATIONS

Office Action dated Oct. 10, 2014 for U.S. Appl. No. 14/106,358.
Office Action dated Oct. 16, 2014 for U.S. Appl. No. 14/106,212.
New Zealand First Examination Report for Application No. 619616 dated Oct. 10, 2014.
Machine English translation of EP0086869.
Singapore Office Action dated Dec. 18, 2014 for Singapore Application No. 2014002273.
Third-Party Submission Under 37 CFRF 1.290 filed on Feb. 26, 2015 in U.S. Appl. No. 13/491,007.
Certified English translation of EP0086869.
Office Action dated Apr. 30, 2015 for U.S. Appl. No. 14/462,073.
Office Action dated Apr. 14, 2015 for U.S. Appl. No. 14/106,212.

(Continued)

*Primary Examiner* — Irina S Zemel

(74) *Attorney, Agent, or Firm* — Barnes & Thornburg LLP

(57) ABSTRACT

A formulation includes a polymeric material, a nucleating agent, and a surface active agent. The formulation can be used to form an insulated container.

3 Claims, 12 Drawing Sheets

(56) References Cited

U.S. PATENT DOCUMENTS

| | | |
|---|---|---|
| 4,550,046 A | 10/1985 | Miller |
| 4,579,275 A | 4/1986 | Peelman |
| 4,604,324 A | 8/1986 | Nahmias |
| 4,621,763 A | 11/1986 | Brauner |
| 4,706,873 A | 11/1987 | Schulz |
| 4,720,023 A | 1/1988 | Jeff |
| 4,856,989 A | 8/1989 | Siebert |
| 4,878,970 A | 11/1989 | Schubert |
| 4,918,112 A | 4/1990 | Roox |
| 4,940,736 A | 7/1990 | Alteepping |
| 5,078,817 A | 1/1992 | Takagaki |
| 5,116,881 A | 5/1992 | Park |
| 5,149,579 A | 9/1992 | Park |
| 5,158,986 A | 10/1992 | Cha |
| 5,160,674 A | 11/1992 | Colton |
| 5,180,751 A | 1/1993 | Park |
| 5,236,963 A | 8/1993 | Jacoby |
| 5,256,462 A | 10/1993 | Callahan |
| 5,286,428 A | 2/1994 | Hayashi |
| 5,308,568 A | 5/1994 | Lipp |
| 5,348,795 A | 9/1994 | Park |
| 5,366,791 A | 11/1994 | Carr |
| 5,385,260 A | 1/1995 | Gatcomb |
| 5,443,769 A | 8/1995 | Karabedian |
| 5,445,315 A | 8/1995 | Shelby |
| 5,490,631 A | 2/1996 | Iioka |
| 5,507,640 A | 4/1996 | Gilmer |
| 5,547,124 A | 8/1996 | Mueller |
| 5,549,864 A | 8/1996 | Greene |
| 5,605,936 A | 2/1997 | DeNicola, Jr. |
| 5,622,308 A | 4/1997 | Ito |
| 5,628,453 A | 5/1997 | MacLaughlin |
| 5,629,076 A | 5/1997 | Fukasawa |
| 5,713,512 A | 2/1998 | Barrett |
| 5,759,624 A | 6/1998 | Neale |
| 5,765,710 A | 6/1998 | Bergerioux |
| 5,766,709 A | 6/1998 | Geddes |
| 5,769,311 A | 6/1998 | Morita |
| 5,819,507 A | 10/1998 | Kaneko |
| 5,840,139 A | 11/1998 | Geddes |
| 5,866,053 A | 2/1999 | Park |
| 5,868,309 A | 2/1999 | Sandstrom |
| 5,895,614 A | 4/1999 | Rivera |
| 5,925,450 A | 7/1999 | Karabedian |
| 5,928,741 A | 7/1999 | Andersen |
| 5,944,225 A | 8/1999 | Kawolics |
| 5,948,839 A | 9/1999 | Chatterjee |
| 6,007,437 A | 12/1999 | Schickert |
| 6,010,062 A | 1/2000 | Shimono |
| 6,030,476 A | 2/2000 | Geddes |
| 6,034,144 A | 3/2000 | Shioya |
| 6,051,174 A | 4/2000 | Park |
| 6,071,580 A | 6/2000 | Bland |
| 6,077,878 A | 6/2000 | Okura |
| 6,083,611 A | 7/2000 | Eichbauer |
| 6,103,153 A | 8/2000 | Park |
| 6,109,518 A | 8/2000 | Mueller |
| 6,129,653 A | 10/2000 | Fredricks |
| 6,136,396 A | 10/2000 | Gilmer |
| 6,139,665 A | 10/2000 | Schmelzer |
| 6,142,331 A | 11/2000 | Breining |
| 6,169,122 B1 | 1/2001 | Blizard |
| 6,174,930 B1 | 1/2001 | Agarwal |
| 6,193,098 B1 | 2/2001 | Mochizuki |
| 6,218,023 B1 | 4/2001 | DeNicola |
| 6,225,366 B1 | 5/2001 | Raetzsch |
| 6,231,942 B1 | 5/2001 | Blizard |
| 6,235,380 B1 | 5/2001 | Tupil |
| 6,257,485 B1 | 7/2001 | Sadlier |
| 6,258,862 B1 | 7/2001 | Matz |
| 6,267,837 B1 | 7/2001 | Mitchell |
| 6,284,810 B1 | 9/2001 | Burnham |
| 6,294,115 B1 | 9/2001 | Blizard |
| 6,306,973 B1 | 10/2001 | Takaoka |
| 6,308,883 B1 | 10/2001 | Schmelzer |
| 6,319,590 B1 | 11/2001 | Geddes |
| 6,328,916 B1 | 12/2001 | Nishikawa |
| 6,376,059 B1 * | 4/2002 | Anderson ............... B29C 44/08 264/50 |
| 6,378,733 B1 | 4/2002 | Boonzaier |
| 6,379,802 B2 | 4/2002 | Ito |
| 6,383,425 B1 | 5/2002 | Wu |
| 6,420,024 B1 | 7/2002 | Perez |
| 6,444,073 B1 | 9/2002 | Reeves |
| 6,455,150 B1 | 9/2002 | Sheppard |
| 6,468,451 B1 | 10/2002 | Perez |
| 6,472,473 B1 | 10/2002 | Ansems |
| RE37,923 E | 12/2002 | Baldwin |
| 6,512,019 B1 | 1/2003 | Agarwal |
| 6,521,675 B1 | 2/2003 | Wu |
| 6,541,105 B1 | 4/2003 | Park |
| 6,562,447 B2 | 5/2003 | Wu |
| 6,565,934 B1 | 5/2003 | Fredricks |
| 6,586,532 B1 | 7/2003 | Gauthy |
| 6,593,005 B2 | 7/2003 | Tau |
| 6,593,384 B2 | 7/2003 | Anderson |
| 6,613,811 B1 | 9/2003 | Pallaver |
| 6,616,434 B1 | 9/2003 | Burnham |
| 6,646,019 B2 | 11/2003 | Perez |
| 6,649,666 B1 | 11/2003 | Read |
| 6,713,139 B2 | 3/2004 | Usui |
| 6,720,362 B1 | 4/2004 | Park |
| 6,749,913 B2 | 6/2004 | Watanabe |
| 6,779,662 B2 | 8/2004 | Dorsey |
| 6,811,843 B2 | 11/2004 | DeBraal |
| 6,814,253 B2 | 11/2004 | Wong |
| 6,875,826 B1 | 4/2005 | Huovinen |
| 6,883,677 B2 | 4/2005 | Goeking |
| 6,884,377 B1 * | 4/2005 | Burnham ............... B29C 44/322 264/50 |
| 6,884,851 B2 | 4/2005 | Gauthy |
| 6,908,651 B2 | 6/2005 | Watanabe |
| 6,926,507 B2 | 8/2005 | Cardona |
| 6,926,512 B2 | 8/2005 | Wu |
| 6,982,107 B1 | 1/2006 | Hennen |
| 7,056,563 B2 | 6/2006 | Halabisky |
| 7,070,852 B1 | 7/2006 | Reiners |
| 7,074,466 B2 | 7/2006 | DeBraal |
| 7,094,463 B2 | 8/2006 | Haas |
| 7,121,991 B2 | 10/2006 | Mannlein |
| 7,144,532 B2 | 12/2006 | Kim |
| 7,173,069 B2 | 2/2007 | Swennen |
| 7,234,629 B2 | 6/2007 | Herbert |
| 7,281,650 B1 | 10/2007 | Milan |
| 7,355,089 B2 | 4/2008 | Chang |
| 7,361,720 B2 | 4/2008 | Pierini |
| 7,365,136 B2 | 4/2008 | Huovinen |
| 7,423,071 B2 | 9/2008 | Mogami |
| 7,458,504 B2 | 12/2008 | Robertson |
| 7,504,347 B2 | 3/2009 | Poon |
| 7,510,098 B2 | 3/2009 | Hartjes |
| 7,513,386 B2 | 4/2009 | Hartjes |
| 7,514,517 B2 | 4/2009 | Hoenig |
| 7,524,911 B2 | 4/2009 | Karjala |
| 7,557,147 B2 | 7/2009 | Martinez |
| 7,579,408 B2 | 8/2009 | Walton |
| 7,582,716 B2 | 9/2009 | Liang |
| 7,585,557 B2 | 9/2009 | Aylward |
| 7,592,397 B2 | 9/2009 | Markovich |
| 7,608,668 B2 | 10/2009 | Shan |
| 7,622,179 B2 | 11/2009 | Patel |
| 7,622,529 B2 | 11/2009 | Walton |
| 7,622,881 B2 | 11/2009 | Golownia et al. |
| 7,629,416 B2 | 12/2009 | Li |
| 7,655,296 B2 | 2/2010 | Haas |
| 7,662,881 B2 | 2/2010 | Walton |
| 7,666,918 B2 | 2/2010 | Prieto |
| 7,671,106 B2 | 3/2010 | Markovich |
| 7,671,131 B2 | 3/2010 | Hughes |
| 7,673,564 B2 | 3/2010 | Wolf |
| 7,687,442 B2 | 3/2010 | Walton |
| 7,695,812 B2 | 4/2010 | Peng |
| 7,714,071 B2 | 5/2010 | Hoenig |
| 7,732,052 B2 | 6/2010 | Chang |

(56) References Cited

U.S. PATENT DOCUMENTS

| | | |
|---|---|---|
| 7,737,061 B2 | 6/2010 | Chang |
| 7,737,215 B2 | 6/2010 | Chang |
| 7,741,397 B2 | 6/2010 | Liang |
| 7,754,814 B2 | 7/2010 | Barcus |
| 7,759,404 B2 | 7/2010 | Burgun |
| 7,786,216 B2 | 8/2010 | Soediono |
| 7,787,216 B2 | 8/2010 | Soediono |
| 7,795,321 B2 | 9/2010 | Cheung |
| 7,803,728 B2 | 9/2010 | Poon |
| 7,811,644 B2 | 10/2010 | DeBraal |
| 7,818,866 B2 | 10/2010 | Hollis |
| 7,820,282 B2 | 10/2010 | Haas |
| 7,825,166 B2 | 11/2010 | Sasaki |
| 7,841,974 B2 | 11/2010 | Hartjes |
| 7,842,770 B2 | 11/2010 | Liang |
| 7,858,706 B2 | 12/2010 | Arriola |
| 7,863,379 B2 | 1/2011 | Kapur |
| 7,883,769 B2 | 2/2011 | Seth |
| 7,893,166 B2 | 2/2011 | Shan |
| 7,897,689 B2 | 3/2011 | Harris |
| 7,906,587 B2 | 3/2011 | Poon |
| 7,906,588 B2 | 3/2011 | Poon |
| 7,910,658 B2 | 3/2011 | Chang |
| 7,915,192 B2 | 3/2011 | Arriola |
| 7,918,005 B2 | 4/2011 | Hollis |
| 7,918,016 B2 | 4/2011 | Hollis |
| 7,922,071 B2 | 4/2011 | Robertson |
| 7,922,971 B2 | 4/2011 | Robertson |
| 7,928,162 B2 | 4/2011 | Kiss |
| 7,928,176 B2 | 4/2011 | Kiss |
| 7,935,740 B2 | 5/2011 | Dang |
| 7,947,367 B2 | 5/2011 | Poon |
| 7,951,882 B2 | 5/2011 | Arriola |
| 7,977,397 B2 | 7/2011 | Cheung |
| 7,989,543 B2 | 8/2011 | Karjala |
| 7,993,254 B2 | 8/2011 | Robertson |
| 7,998,579 B2 | 8/2011 | Lin |
| 7,998,728 B2 | 8/2011 | Rhoads |
| 8,003,176 B2 | 8/2011 | Ylitalo |
| 8,003,744 B2 | 8/2011 | Okamoto |
| 8,012,550 B2 | 9/2011 | Ylitalo |
| 8,026,291 B2 | 9/2011 | Handa |
| 8,043,695 B2 | 10/2011 | Ballard |
| 8,067,319 B2 | 11/2011 | Poon |
| 8,076,381 B2 | 12/2011 | Miyagawa |
| 8,076,416 B2 | 12/2011 | Ellul |
| 8,084,537 B2 | 12/2011 | Walton |
| 8,087,147 B2 | 1/2012 | Hollis |
| 8,105,459 B2 | 1/2012 | Alvarez |
| 8,119,237 B2 | 2/2012 | Peng |
| 8,124,234 B2 | 2/2012 | Weaver |
| 8,173,233 B2 | 5/2012 | Rogers |
| 8,198,374 B2 | 6/2012 | Arriola |
| 8,211,982 B2 | 7/2012 | Harris |
| 8,227,075 B2 | 7/2012 | Matsushita |
| 8,273,068 B2 | 9/2012 | Chang |
| 8,273,826 B2 | 9/2012 | Walton |
| 8,273,838 B2 | 9/2012 | Shan |
| 8,288,470 B2 | 10/2012 | Ansems |
| 8,304,496 B2 | 11/2012 | Weaver |
| 8,404,780 B2 | 3/2013 | Weaver |
| 8,435,615 B2 | 5/2013 | Tsuchida |
| 8,679,620 B2 | 3/2014 | Matsushita |
| 8,715,449 B2 | 5/2014 | Leser |
| 8,721,823 B2 | 5/2014 | Vaideeswaran |
| 8,883,280 B2 | 11/2014 | Leser |
| 9,067,705 B2 | 6/2015 | Leser |
| 9,180,995 B2 | 11/2015 | Iyori |
| 9,358,772 B2 | 6/2016 | Leser |
| 2001/0010848 A1 | 8/2001 | Usui |
| 2001/0010849 A1 | 8/2001 | Blizard |
| 2001/0038893 A1 | 11/2001 | Mohan |
| 2001/0041236 A1 | 11/2001 | Usui |
| 2002/0030296 A1 | 3/2002 | Geddes |
| 2002/0035164 A1 | 3/2002 | Wu et al. |
| 2002/0041046 A1 | 4/2002 | Hartjes |
| 2002/0058126 A1 | 5/2002 | Kannankeril |
| 2002/0135088 A1* | 9/2002 | Harfmann ............ B29C 44/462 264/40.6 |
| 2002/0137851 A1 | 9/2002 | Kim |
| 2002/0144769 A1 | 10/2002 | Debraal |
| 2002/0172818 A1 | 11/2002 | DeBraal |
| 2003/0003251 A1 | 1/2003 | DeBraal |
| 2003/0017284 A1 | 1/2003 | Watanabe |
| 2003/0021921 A1 | 1/2003 | DeBraal |
| 2003/0029876 A1 | 2/2003 | Giraud |
| 2003/0069362 A1 | 4/2003 | Ramanathan |
| 2003/0108695 A1 | 6/2003 | Freek |
| 2003/0138515 A1 | 7/2003 | Harfmann |
| 2003/0211310 A1 | 11/2003 | Haas |
| 2003/0228336 A1 | 12/2003 | Gervasio |
| 2003/0232210 A1 | 12/2003 | Haas |
| 2004/0013830 A1 | 1/2004 | Nonomura |
| 2004/0031714 A1 | 2/2004 | Hanson |
| 2004/0038018 A1 | 2/2004 | Anderson |
| 2004/0062885 A1 | 4/2004 | Imanari |
| 2004/0115418 A1 | 6/2004 | Anderson |
| 2004/0170814 A1 | 9/2004 | Vanhandel |
| 2005/0003122 A1 | 1/2005 | Debraal |
| 2005/0006449 A1 | 1/2005 | DAmato |
| 2005/0040218 A1 | 2/2005 | Hinchey |
| 2005/0101926 A1 | 5/2005 | Ausen |
| 2005/0104365 A1 | 5/2005 | Haas |
| 2005/0115975 A1 | 6/2005 | Smith |
| 2005/0121457 A1 | 6/2005 | Wilson |
| 2005/0124709 A1 | 6/2005 | Krueger |
| 2005/0145317 A1 | 7/2005 | Yamamoto |
| 2005/0147807 A1 | 7/2005 | Haas |
| 2005/0159496 A1 | 7/2005 | Bambara |
| 2005/0165165 A1* | 7/2005 | Zwynenburg ......... C08J 9/0061 525/88 |
| 2005/0184136 A1 | 8/2005 | Baynum, III |
| 2005/0236294 A1 | 10/2005 | Herbert |
| 2005/0256215 A1 | 11/2005 | Burnham |
| 2005/0272858 A1 | 12/2005 | Pierini |
| 2005/0288383 A1 | 12/2005 | Haas |
| 2006/0000882 A1 | 1/2006 | Darzinskas |
| 2006/0094577 A1 | 5/2006 | Mannlein |
| 2006/0095151 A1 | 5/2006 | Mannlein |
| 2006/0108409 A1 | 5/2006 | Pyper |
| 2006/0135699 A1 | 6/2006 | Li |
| 2006/0148920 A1 | 7/2006 | Musgrave |
| 2006/0151584 A1 | 7/2006 | Wonnacott |
| 2006/0178478 A1 | 8/2006 | Ellul |
| 2006/0198983 A1 | 9/2006 | Patel |
| 2006/0199006 A1 | 9/2006 | Poon |
| 2006/0199030 A1 | 9/2006 | Liang |
| 2006/0199744 A1 | 9/2006 | Walton |
| 2006/0199872 A1 | 9/2006 | Prieto |
| 2006/0199884 A1 | 9/2006 | Hoenig |
| 2006/0199887 A1 | 9/2006 | Liang |
| 2006/0199896 A1 | 9/2006 | Walton |
| 2006/0199897 A1 | 9/2006 | Karjala |
| 2006/0199905 A1 | 9/2006 | Hughes |
| 2006/0199906 A1 | 9/2006 | Walton |
| 2006/0199907 A1 | 9/2006 | Chang |
| 2006/0199908 A1 | 9/2006 | Cheung |
| 2006/0199910 A1 | 9/2006 | Walton |
| 2006/0199911 A1 | 9/2006 | Markovich |
| 2006/0199912 A1 | 9/2006 | Fuchs |
| 2006/0199914 A1 | 9/2006 | Harris |
| 2006/0199930 A1 | 9/2006 | Shan |
| 2006/0199931 A1 | 9/2006 | Poon |
| 2006/0199933 A1 | 9/2006 | Okamoto |
| 2006/0205833 A1 | 9/2006 | Martinez |
| 2006/0211819 A1 | 9/2006 | Hoenig |
| 2006/0234033 A1 | 10/2006 | Nishikawa |
| 2006/0289609 A1 | 12/2006 | Fritz |
| 2006/0289610 A1 | 12/2006 | Kling |
| 2007/0000983 A1 | 1/2007 | Spurrell |
| 2007/0010616 A1 | 1/2007 | Kapur |
| 2007/0032600 A1 | 2/2007 | Mogami |
| 2007/0056964 A1 | 3/2007 | Holcomb |
| 2007/0065615 A1 | 3/2007 | Odle |

(56) References Cited

U.S. PATENT DOCUMENTS

| | | |
|---|---|---|
| 2007/0066756 A1 | 3/2007 | Poon |
| 2007/0078222 A1 | 4/2007 | Chang |
| 2007/0095837 A1 | 5/2007 | Meier |
| 2007/0112127 A1 | 5/2007 | Soediono |
| 2007/0141188 A1 | 6/2007 | Kim |
| 2007/0155900 A1 | 7/2007 | Chang |
| 2007/0167315 A1 | 7/2007 | Arriola |
| 2007/0167575 A1 | 7/2007 | Weaver |
| 2007/0167578 A1 | 7/2007 | Arriola |
| 2007/0202330 A1 | 8/2007 | Peng |
| 2007/0219334 A1 | 9/2007 | Shan |
| 2008/0020162 A1 | 1/2008 | Fackler |
| 2008/0044617 A1 | 2/2008 | Schmitz |
| 2008/0045638 A1 | 2/2008 | Chapman |
| 2008/0118738 A1 | 5/2008 | Boyer |
| 2008/0121681 A1 | 5/2008 | Wiedmeyer |
| 2008/0138593 A1 | 6/2008 | Martinez |
| 2008/0156857 A1 | 7/2008 | Johnston |
| 2008/0177242 A1 | 7/2008 | Chang |
| 2008/0227877 A1 | 9/2008 | Stadlbauer |
| 2008/0234435 A1 | 9/2008 | Chang |
| 2008/0260996 A1 | 10/2008 | Heilman |
| 2008/0269388 A1 | 10/2008 | Markovich |
| 2008/0280517 A1 | 11/2008 | Chang |
| 2008/0281037 A1 | 11/2008 | Karjala |
| 2008/0302800 A1 | 12/2008 | Chou |
| 2008/0311812 A1 | 12/2008 | Arriola |
| 2009/0041965 A1 | 2/2009 | Kochem |
| 2009/0042472 A1 | 2/2009 | Poon |
| 2009/0068402 A1 | 3/2009 | Yoshida |
| 2009/0069523 A1 | 3/2009 | Itakura |
| 2009/0076216 A1 | 3/2009 | Kiss |
| 2009/0105417 A1 | 4/2009 | Walton |
| 2009/0110855 A1 | 4/2009 | McCarthy |
| 2009/0110944 A1 | 4/2009 | Aguirre |
| 2009/0170679 A1 | 7/2009 | Hartjes |
| 2009/0220711 A1 | 9/2009 | Chang |
| 2009/0247033 A1 | 10/2009 | Peng |
| 2009/0263645 A1 | 10/2009 | Barger |
| 2009/0027569 A1 | 11/2009 | Nishimura et al. |
| 2009/0275690 A1 | 11/2009 | Weaver |
| 2009/0324914 A1 | 12/2009 | Lieng |
| 2010/0025073 A1 | 2/2010 | Fagrell |
| 2010/0028568 A1 | 2/2010 | Weaver |
| 2010/0029827 A1 | 2/2010 | Ansems |
| 2010/0040818 A1 | 2/2010 | Farha |
| 2010/0055358 A1 | 3/2010 | Weaver |
| 2010/0069574 A1 | 3/2010 | Shan |
| 2010/0093942 A1 | 4/2010 | Silvis |
| 2010/0108695 A1 | 5/2010 | Zhang |
| 2010/0116422 A1 | 5/2010 | Vaideeswaran |
| 2010/0137118 A1 | 6/2010 | Chang |
| 2010/0168267 A1 | 7/2010 | Dang |
| 2010/0181328 A1 | 7/2010 | Cook |
| 2010/0181370 A1 | 7/2010 | Berbert |
| 2010/0196610 A1 | 8/2010 | Chang |
| 2010/0240818 A1 | 9/2010 | Walton |
| 2010/0279571 A1 | 11/2010 | Poon |
| 2010/0324202 A1 | 12/2010 | Bafna |
| 2011/0003929 A1 | 1/2011 | Soediono |
| 2011/0008570 A1 | 1/2011 | Seth |
| 2011/0009513 A1 | 1/2011 | Chaudhary |
| 2011/0014835 A1 | 1/2011 | Sieradzki |
| 2011/0091688 A1 | 4/2011 | Maurer |
| 2011/0104414 A1 | 5/2011 | Onodera |
| 2011/0111150 A1 | 5/2011 | Matsuzaki |
| 2011/0118370 A1 | 5/2011 | Jiang |
| 2011/0118416 A1 | 5/2011 | Arriola |
| 2011/0124818 A1 | 5/2011 | Arriola |
| 2011/0136959 A1 | 6/2011 | Brandstetter |
| 2011/0144240 A1 | 6/2011 | Harris |
| 2011/0217492 A1 | 9/2011 | Stamatiou |
| 2011/0229693 A1 | 9/2011 | Maurer |
| 2011/0230108 A1 | 9/2011 | Arriola |
| 2011/0318560 A1 | 12/2011 | Yun |
| 2012/0004087 A1 | 1/2012 | Tharayil |
| 2012/0024873 A1 | 2/2012 | Roseblade |
| 2012/0028065 A1 | 2/2012 | Bafna |
| 2012/0041148 A1 | 2/2012 | Bafna |
| 2012/0043374 A1 | 2/2012 | Lemon |
| 2012/0045603 A1 | 2/2012 | Zerafati |
| 2012/0108714 A1 | 5/2012 | Wittner |
| 2012/0108741 A1 | 5/2012 | Wittner |
| 2012/0108743 A1 | 5/2012 | Krishnaswamy |
| 2012/0125926 A1 | 5/2012 | Iyori |
| 2012/0132699 A1 | 5/2012 | Mann |
| 2012/0178896 A1 | 7/2012 | Bastioli |
| 2012/0184657 A1 | 7/2012 | Lake |
| 2012/0193365 A1 | 8/2012 | Humphries |
| 2012/0199278 A1 | 8/2012 | Lee |
| 2012/0199279 A1 | 8/2012 | Lee |
| 2012/0199641 A1 | 8/2012 | Hsieh |
| 2012/0214890 A1 | 8/2012 | Senda |
| 2012/0220730 A1 | 8/2012 | Li |
| 2012/0225961 A1 | 9/2012 | VanHorn |
| 2012/0237734 A1 | 9/2012 | Maurer |
| 2012/0267368 A1 | 10/2012 | Wu |
| 2012/0270039 A1 | 10/2012 | Tynys |
| 2012/0295994 A1 | 11/2012 | Bernreitner |
| 2012/0318805 A1 | 12/2012 | Leser |
| 2012/0318807 A1 | 12/2012 | Leser |
| 2012/0318859 A1 | 12/2012 | Leser |
| 2013/0023598 A1 | 1/2013 | Song |
| 2013/0032963 A1 | 2/2013 | Tokiwa |
| 2013/0052385 A1 | 2/2013 | Leser |
| 2013/0140320 A1 | 6/2013 | Nadella |
| 2013/0216744 A1 | 8/2013 | Liao |
| 2013/0280517 A1 | 10/2013 | Buehring |
| 2013/0303645 A1 | 11/2013 | Dix |
| 2014/0131430 A1 | 5/2014 | Leser |
| 2014/0263367 A1 | 9/2014 | Robertson |
| 2015/0250342 A1 | 9/2015 | Euler |
| 2015/0258771 A1 | 9/2015 | Leser |

FOREIGN PATENT DOCUMENTS

| | | |
|---|---|---|
| CN | 1288427 | 3/2001 |
| CN | 1495100 | 5/2004 |
| CN | 1942370 | 4/2007 |
| CN | 101370873 | 2/2009 |
| CN | 101429309 | 5/2009 |
| CN | 101531260 | 9/2009 |
| CN | 101538387 | 9/2009 |
| CN | 201347706 Y | 11/2009 |
| CN | 102089370 | 6/2011 |
| CN | 102115561 | 7/2011 |
| CN | 102245368 | 11/2011 |
| CN | 102391570 | 3/2012 |
| CN | 102762350 | 10/2012 |
| DE | 2831240 | 1/1980 |
| DE | 2831240 C | 3/1988 |
| DE | 102006025612 | 11/2007 |
| DE | 102006025612 A1 | 11/2007 |
| DE | 102008031812 | 12/2009 |
| EP | 0001791 | 5/1979 |
| EP | 0086869 | 8/1983 |
| EP | 0161597 | 11/1985 |
| EP | 0318167 | 5/1989 |
| EP | 0520028 | 12/1992 |
| EP | 0570221 | 11/1993 |
| EP | 0588321 | 3/1994 |
| EP | 0659647 | 6/1995 |
| EP | 879844 | 11/1998 |
| EP | 0879844 | 11/1998 |
| EP | 0972727 | 1/2000 |
| EP | 0796199 | 2/2001 |
| EP | 0940240 | 10/2002 |
| EP | 1308263 | 5/2003 |
| EP | 1323779 | 7/2003 |
| EP | 1479716 | 11/2004 |
| EP | 1666530 | 6/2006 |
| EP | 1754744 | 2/2007 |
| EP | 1921023 A1 | 5/2008 |
| EP | 1939099 | 7/2008 |

(56) References Cited

FOREIGN PATENT DOCUMENTS

| | | |
|---|---|---|
| EP | 2266894 | 12/2010 |
| EP | 2386584 A1 | 11/2011 |
| EP | 2386601 | 11/2011 |
| EP | 2720954 | 4/2014 |
| GB | 1078326 | 8/1967 |
| GB | 2322100 | 8/1998 |
| GB | 2485077 | 5/2012 |
| JP | 52123043 | 10/1977 |
| JP | 52123043 U | 10/1977 |
| JP | S5641146 A | 4/1981 |
| JP | 58029618 | 2/1983 |
| JP | H02129040 U | 5/1990 |
| JP | H02269683 | 11/1990 |
| JP | H0543967 | 6/1993 |
| JP | 0615751 | 1/1994 |
| JP | 3140847 | 1/1994 |
| JP | 06192460 | 7/1994 |
| JP | H08067758 | 3/1996 |
| JP | 2000128255 | 5/2000 |
| JP | P310847 | 12/2000 |
| JP | 2001310429 | 11/2001 |
| JP | 2001315277 | 11/2001 |
| JP | 2003292663 | 10/2003 |
| JP | 2003321566 | 11/2003 |
| JP | 200418101 | 1/2004 |
| JP | 2004018101 | 1/2004 |
| JP | 2004168421 | 6/2004 |
| JP | 2004168421 A | 6/2004 |
| JP | 2004330464 | 11/2004 |
| JP | 2005272542 | 10/2005 |
| JP | 2006096390 | 4/2006 |
| JP | 2006130814 A | 5/2006 |
| JP | 2006142008 A | 6/2006 |
| JP | 200791323 | 4/2007 |
| JP | 2007154172 | 6/2007 |
| JP | 2008162700 | 7/2008 |
| JP | 2009504858 | 2/2009 |
| JP | 2009066856 A | 4/2009 |
| JP | 2009126922 | 6/2009 |
| JP | 2009138029 | 6/2009 |
| JP | 2009190756 A | 8/2009 |
| JP | 2010173258 | 8/2010 |
| JP | 2011104890 | 6/2011 |
| KR | 100306320 | 10/2001 |
| KR | 2003036558 | 5/2003 |
| KR | 2004017234 | 2/2004 |
| KR | 101196666 | 11/2012 |
| TW | 393427 | 6/2000 |
| TW | 200404848 | 4/2004 |
| TW | M362648 | 8/2009 |
| TW | 201021747 | 6/2010 |
| WO | 9113933 | 9/1991 |
| WO | 9413460 | 6/1994 |
| WO | 1994013460 | 6/1994 |
| WO | 9729150 | 8/1997 |
| WO | 1998016575 | 4/1998 |
| WO | 0002800 | 1/2000 |
| WO | 0119733 | 3/2001 |
| WO | 0132758 | 5/2001 |
| WO | 0153079 | 7/2001 |
| WO | 0234824 | 5/2002 |
| WO | 03076497 | 9/2003 |
| WO | 03099913 | 12/2003 |
| WO | 2004104075 | 12/2004 |
| WO | 2006042908 | 4/2006 |
| WO | 2006124369 | 11/2006 |
| WO | 2007003523 | 1/2007 |
| WO | 2007020074 | 2/2007 |
| WO | 2007068766 | 6/2007 |
| WO | 2007090845 A2 | 8/2007 |
| WO | 2008030953 | 3/2008 |
| WO | 2008038750 | 4/2008 |
| WO | 2008045944 | 4/2008 |
| WO | 2008057878 | 5/2008 |
| WO | 2008080111 | 7/2008 |
| WO | 2008145267 | 12/2008 |
| WO | 2009035580 | 3/2009 |
| WO | 2010006272 | 1/2010 |
| WO | 2010019146 | 2/2010 |
| WO | 2010076701 A1 | 7/2010 |
| WO | 2010111869 | 10/2010 |
| WO | 2011005856 | 1/2011 |
| WO | 2011036272 | 3/2011 |
| WO | 2011036272 A2 | 3/2011 |
| WO | 2011038081 | 3/2011 |
| WO | 2011076637 | 6/2011 |
| WO | 2011141044 | 11/2011 |
| WO | 2012020106 | 2/2012 |
| WO | 2012025584 | 3/2012 |
| WO | 2012044730 | 4/2012 |
| WO | 2012055797 | 5/2012 |
| WO | 2012099682 | 7/2012 |
| WO | 2012173873 | 12/2012 |
| WO | 2012174422 | 12/2012 |
| WO | 2012174567 | 12/2012 |
| WO | 2012174568 | 12/2012 |
| WO | 2013032552 | 3/2013 |
| WO | 2013101301 | 7/2013 |

OTHER PUBLICATIONS

Office Action dated Apr. 10, 2015 for U.S. Appl. No. 14/106,358.
English translation of Spanish Search Report of Application No. 201490025, dated Apr. 20, 2015. .
Spanish Search Report for Application No. 201490025, dated Apr. 20, 2015.
Borealis AG, DAPLOY(TM) HMS Polypropylene for Foam Extrusion, 2010, 20 pages.
International Search Report and Written Opinion dated Apr. 16, 2014, relating to International Application No. PCT/US2013/075013.
International Search Report and Written Opinion dated Apr. 21, 2014, relating to International Application No. PCT/US2013/074923.
International Search Report and Written Opinion dated Apr. 22, 2014, relating to PCT/US2013/074965.
International Search Report and Written Opinion dated Apr. 25, 2014, relating to PCT/US2013/075052.
International Search Report and Written Opinion dated Sep. 17, 2013, relating to International Application No. PCT/US2012/041395.
International Search Report dated Feb. 26, 2013, relating to International Application No. PCT/US2012/043018.
International Search Report dated Jan. 29, 2013, relating to International Application No. PCT/US2012/043017.
International Search Report dated Jan. 30, 2013, relating to International Application No. PCT/US2012/042737.
International Search Report dated Jul. 29, 2013, relating to International Application No. PCT/US2012/043016, 25 pages.
International Search Report dated Jul. 30, 2012, relating to International Application No. PCT/US2012/041397.
International Search Report dated Mar. 11, 2014, relating to International Application No. PCT/US2013/66811.
International Search Report dated Nov. 19, 2012, relating to International Application No. PCT/US2012/041395.
Jaakko I. Raukola, A New Technology to Manufacture Polypropylene Foam Sheet and Biaxially Oriented Foam Film, VTT Publications 361, Technical Research Centre of Finland, Apr. 1998, 100 pages.
Machine English translation of JP 2006-130814.
Office Action dated Jun. 23, 2015 for U.S. Appl. No. 13/525,640.
Third Party Submission Under 37 CFR 1.290 in U.S. Appl. No. 14/188,504 submitted May 11, 2015 and May 27, 2015 (43 pages).
Naguib et al., "Fundamental Foaming Mechanisms Governing the Volume Expansion of Extruded Polypropylene Foams," Journal of Applied Polymer Science, vol. 91, pp. 2661-2668, 2004 (10 pages).
Wang et al., "Extending PP\s Foamability Through Tailored Melt Strength and Crystallization Kinetics," paper 19 from the Conference Proceedings of the 8th International Conferences of Blowing

(56) References Cited

OTHER PUBLICATIONS

Agents and Foaming Processes, May 16-17, 2006 in Munich, Germany Smithers Rapra Ltd, 2006 (14 pages).
Australian First Patent Examination Report for Application No. 2012302251 dated Jul. 9, 2015.
International Search Report and Written Opinion dated Jul. 3, 2014, relating to International Application No. PCT/US2014/025697.
Office Action dated May 19, 2015 for Chinese Application No. 201280035667.4.
Office Action Chinese Patent Application No. 201280051426.9 dated Jul. 23, 2015.
Office Action dated Aug. 27, 2015 for U.S. Appl. No. 14/106,358.
Office Action dated Aug. 18, 2015 for U.S. Appl. No. 14/106,212.
Certified English translation of JP2003292663.
Office action dated Apr. 11, 2014 for U.S. Appl. No. 13/526,417.
Office Action dated Aug. 19, 2014 for Chinese Application No. 201280035667.4.
Office Action dated Aug. 21, 2014 for U.S. Appl. No. 13/526,454.
Office Action dated Jul. 25, 2014 for U.S. Appl. No. 13/525,640.
Office Action dated Sep. 25, 2014 for U.S. Appl. No. 13/526,417.
European Search Report of Application No. 12861450.0, dated Nov. 21, 2014.
International Search Report dated Nov. 7, 2014, relating to International Application No. PCT/US2014/51508.
New Zealand First Examination Report for Application No. 621219 dated Nov. 17, 2014.
Third-Party Submission Under 37 CFR 1.290 filed on Dec. 9, 2014 in U.S. Appl. No. 14/063,252.
International Search Report and Written Opinion dated Jan. 19, 2015, relating to International Application No. PCT/US2014/059312.
International Search Report dated Jan. 19, 2015, relating to International Application No. PCT/US2014/059216.
Office Action dated Feb. 2, 2015 for U.S Appl. No. 14/106,114.
Office Action dated Jan. 6, 2015 for Chinese Application No. 201280034350.9 (11 pages).
Office Action dated Jan. 9, 2015 for Chinese Application No. 201280035667.4 (22 pages).
Spanish Search Report of Application No. 201390099, dated Feb. 9, 2015.
International Search Report and Written Opinion dated Oct. 18, 2013, relating to International Application No. PCT/US2013/053935.
International Preliminary Report on Patentability dated Feb. 16, 2016, relating to International Application No. PCT/US2014/051508.
English Summary of Chinese Office Action for Application Serial No. 201380041896.1, dated Mar. 21, 7 pages.
Extended European Search Report for European Application No. 13827981.5-1708 / 2888092 PCT/US2013/053935, dated Feb. 19, 2016.
Australian First Patent Examination Report for Application No. 2012271047, dated Feb. 29, 2016.
N.N. Najib, N.M. Manan, A.A. Bakar, and C.S. Sipaut, Effect of Blowing Agent Concentration on Cell Morphology and Impact Properties of Natural Rubber Foam, Journal of Physical Science, vol. 20(1), 13-25, 2009 (13 pages).
Nigel Mills, Polymer Foams Handbook, Fig. 2.2, 1st ed. 2007 (2 pages).
University of Massachusetts, Advanced Plastics Processing Lecture, Lecture 11: Foam Processes, Slide 4 (Nov. 11, 2012) (2 pages).
Australian Second Patent Examination Report for Application No. 2012302251, dated Feb. 26, 2016.
English summary of Chinese Office Action for Chinese Application Serial No. 201380065781.6, Apr. 19, 2016, 14 pages.
Affidavit of Christopher Butler of Internet Archive, Borealis webpage dated Jan. 20, 2010 (https://web.archive.org/web/20100120102738/http://www.borealisgroup.com/industry-solutions/advancedpackaging/rigid-packaging/polyolefin-foam/daploy-hmspp-extruded-foam/).

Reichelt et al., "PP-Blends with Tailored Foamability and Mechanical Properties", Cellular Polymers, vol. 22, No. 5, 2003, 14 pages.
Ratzsch et al., "Radical reactions on polypropylene in the solid state", Prog. Polym. Sci. 27 (2002) 1195-1282, 88 pages.
Excerpts from Encyclopedia of Polymer Science and Technology: Plastics, Resins, Rubbers, and Fibers, "Blowing Agents", vol. 2, John Wiley & Sons, Inc. (1965), 37 pages.
Excerpts from Polymer Foams: Science and Technology, Lee et al., "Introduction to Polymeric Foams", CRC Press (2007) 51 pages.
"Daploy(TM) HMS Polypropylene for Foam Extrusion", obtained from Borealis webpage obtained from the Internet Archive\s "Wayback Machine" as of Nov. 16, 2008 https://web.archive.org/web/20081116085125/http://www.borealisgroup.com/pdf/literature/borealisborouge/brochure/K_IN0020_GB_FF_2007_10_BB.pdf).
Excerpts from Gibson and Ashby, Cellular solids: Structure and properties—Second edition, Cambridge University Press, 1997, 66 pages.
Excerpts from Maier and Calafut, Polypropylene: the Definitive User's Guild and Databook, Plastics Design Library, William Andrew Inc. (1998), 35 pages.
ASTM D3763-86, an American Society for Testing of Materials (ASTM), "Standard Method for High-Speed Puncture Properties of Plastics Using Load and Displacement Sensors" (1986 Edition), 5 pages.
ASTM D1922-93, an American Society for Testing of Materials (ASTM), "Standard Method for Propagation Tear Resistance of Plastic Film and Thin Sheeting by Pendulum Method" (1993 Edition), 5 pages.
Naguib et al., "Effect of Supercritical Gas on Crystallization of Linear and Branched Polypropylene Resins with Foaming Additives", Ind. Eng. Chem. Res., 44 (2005), 6685-6691.
Tabatabaei et al., "Rheological and thermal properties of blends of a long-chain branched polypropylene and different linear polypropylenes", Chemical Engineering Science, 64 (2009), 4719-4731.
Almanza et al., "Applicability of the Transient Plane Source Method to Measure the Thermal Conductivity of Low-Density Polyethylene Foams", Journal of Polymer Science: Part B: Polymer Physics, vol. 42 (2004), 1226-1234.
The Burn Foundation, "Scald Burns", available at https://web.archive.org/web/20080926114057/http:/wwwvii.burnfoundation.org/programs/resource.cfm?c=1&a=3, dated Sep. 26, 2008, accessed on Feb. 5, 2016.
AntiScald Inc. available at https://web.archive.org/web/20080517041952/http:/www.antiscald.com/prevention/general_info/table.php, dated May 17, 2008, accessed on Feb. 5, 2016.
"Fire Dynamics", available at http://www.nist.gov/fire/fire_behavior.cfm, accessed on Feb. 5, 2016.
"Power of a Microwave Oven", available at https://web.archive.org/web/20071010183358/http://hypertextbook.com/facts/2007/TatyanaNektalova.shtml, dated Oct. 10, 2007, accessed on Feb. 5, 2016.
Health Physics Society, "Microwave Oven Q & A", available at https://web.archive.org/web/20090302090144/http://www.hps.org/publicinformation/ate/faqs/microwaveovenq&a.html, dated Mar. 2, 2009, accessed on Feb. 5, 2016.
Cook's Info, "Microwave Ovens", available at http://www.cooksinfo.com/microwave-ovens, accessed on Feb. 5, 2016.
Antunes et al., "Heat Transfer in Polypropylene-Based Foams ProducedUsing Different Foaming Processes", Advanced Engineering Materials, 11, No. 10 (2009), 811-817.
Excerpts from Frank Kreith, Principles of Heat Transfer, 3rd ed., Intext Educational Publishers (1973).
Excerpts from James M. Gere, Mechanics of Materials, 5th ed., Brooks/Cole (2001).
Technical data sheet of HIFAX CA 60 A, obtained from https://www.lyondellbasell.com/en/polymers/p/Hifax-CA-60-A/d372c484-8f5a-4b2c-8674-8b7b781a1796, accessed on Feb. 4, 2016, 2 pages.

(56) References Cited

OTHER PUBLICATIONS

Michel Biron, "Chapter 4—Detailed Accounts of Thermoplastic Resins," Thermoplastics and Thermoplastic Composites, Technical Information for Plastics Users, Elsevier Ltd. (2007), 217-714.
Excerpts from Cornelia Vasile, "Mechanical Properties and Parameters of Polyolefins", Handbook of Polyolefins, 2nd ed., Marcel Dekker, Inc. (2000).
Williams et al., "Thermal Connectivity of Plastic Foams", Polymer Engineering and Science, Apr. 1983, vol. 23, No. 6., 293-298.
Excerpts from M.C. McCrum et al., Principles of Polymer Engineering, 2nd ed., Oxford Science Publications (1997).
Excerpts from Robert H. Perry, Perry\s Chemical Engineers Handbook, 7th ed., The McGraw-Hill Companies, Inc. (1997).
Martinez-Diez et al., "The Thermal Conductivity of a Polyethylene Foam Block Produced by a Compression Molding Process", Journal of Cellular Plastics, vol. 37 (2001), 21-42.
Borealis Product Brochure, Daploy HMS Polypropylene for Foam Extrusion (2010), 20 pages.
R. Coquard and D. Baillis, Journal of Heat Transfer, 2006, 128(6): 538-549.
A. R. Katritzky et al., "Correlation and Prediction of the Refractive Indices of Polymers by QSPR," J. Chem. Inf. Comput. Sci., 38 (1998), 1171-1176.
M. Antunes et al., "Heat Transfer in Polyolefin Foams," Heat Transfer in Multi-Phase Materials, A. Öchsner and G. E. Murch, Eds. Springer-Verlag Berlin Heidelberg, 2011, 131-161.
Inter Partes Review Petition for U.S. Pat. No. 8,883,280 (2101 pages) [Submitted in multiple parts—section 1].
Inter Partes Review Petition for U.S. Pat. No. 8,883,280 (2101 pages) [Submitted in multiple parts—section 2].
Inter Partes Review Petition for U.S. Pat. No. 8,883,280 (2101 pages) [Submitted in multiple parts—section 3].
Inter Partes Review Petition for U.S. Pat. No. 8,883,280 (2101 pages) [Submitted in multiple parts—section 4].
English summary of Mexican Office Action for Application Serial No. MX/a/2013/014993, Apr. 27, 2016, 5 pages.
Japanese Office Action for Japanese Patent Application No. 2014-528384, dated Mar. 1, 2016.
English Summary of Chinese Office Action for Application Serial No. 201380041896.1, dated Mar. 18, 2016, 7 pages.
Doerpinghaus et al., "Separating the effects of sparse long-chain branching on rheology from those due to molecular weight in polyethylenes", Journal of Rheology, 47, 717 (2003).
English Summary of Chinese Office Action for Application Serial No. 201280051426.9, Apr. 29, 2016, 5 pages.
Second Chinese Office Action dated Sep. 6, 2015 for Chinese Application Serial No. 201280034350.9.
Office Action dated Oct. 27, 2015 for U.S. Appl. No. 14/462,073.
Third Party Observations filed with respect to European Patent Application No. 12727994.1, Aug. 17, 2015 (22 pages).
U.S. Appl. No. 61/498,455, filed Jun. 17, 2011, related to PCT Application No. PCT/US2012/041395, 46 pages.
"Slip Agents", Polypropylene Handbook, 2nd edition, 2005, pp. 285-286.
English translation of Russian Office Action for Application Serial No. 2015127677, dated Sep. 16, 2015.
English Summary of Russian Office Action for Application Serial No. 2014111340, dated Feb. 25, 2016, 8 pages.
United Kingdom Examination Report for Patent Application No. GB1400762.9 dated Feb. 11, 2016.
Office Action dated Feb. 16, 2016 for U.S. Appl. No. 14/108142.
Extended European Search Report for European Application No. 13849152.7-1303 / 2912142 PCT/US2013/066811, dated Feb. 12, 2016.
English summary of Spanish Office Action for Application Serial No. P201490025, Feb. 9, 2016, 8 pages.
Supplemental European Search Report for European Application No. 12727994.1-1302, dated Feb. 17, 2016.
Inter Partes Review Petition for U.S. Pat. No. 8,883,280 (712 pages) [Reference submitted in three parts].
Borealis webpage dated Jan. 20, 2010 from Internet Archive (6 pages).
Gibson and Ashby, Cellular solids: structure and properties, 2nd ed., Cambridge University Press (1997) (7 pages).
C. Maier and T. Calafut, Polypropylene: the Definitive User\s Guide and Databook, Plastics Design Library, William Andrew Inc. (1998) (19 pages).
Reichelt et al., Cellular Polymers, vol. 22, No. 5 (2003) (14 pages).
Ratzsch et al., Prog. Polym. Sci., 27 (2002), 1195-1282 (88 pages).
Encyclopedia of Polymer Science and Technology: Plastics, Resins, Rubbers, and Fibers, vol. 2, John Wiley & Sons, Inc. (1965) (37 pages).
Shau-Tarng Lee, Chul B. Park, and N.S. Ramesh, Polymer Foams: Science and Technology, CRC Press (2007) (51 pages).
Grant & Hackh\s Chemical Dictionary, 5th ed., McGraw-Hill, Inc. (1987) (3 pages).
Merriam-Webster\s Collegiate Dictionary, 11th ed. (2003), p. 70 (3 pages).
Merriam-Webster\s Collegiate Dictionary, 11th ed. (2003), p. 1237 (3 pages).
Hawley\s Condensed Chemical Dictionary, 14th Ed. (2001) (5 pages).
Reichelt et al., Abstract of PP-Blends with Tailored Foamability and Mechanical Properties, Cellular Polymers, (2003) available from http://www.polymerjournals.com/journals.asp?Page=111&JournalType=cp&JournalIssue=cp22-5&JIP=, listing (4 pages).
Ratzsch et al., Abstract of Radical Reactions on Polypropylene in the Solid State, Progress in Polymer Science, vol. 27, Issue 7, (Sep. 2002), available from http://www.sciencedirect.com/science/article/pii/S0079670002000060 (3 pages).
"Borealis Dapoly HMS Polypropylene for Foam Extrusion" obtained from Borealis webpage obtained from the Internet Archive\s "Wayback Machine" as of Nov. 16, 2008 (https://web.archive.org/web/20081116085125/http://www.borealisgroup.com/pdf/literature/borealis-borouge/brochure/K_IN0020_GB_FF_2007_10_BB.pdf) ("Brochure \08") (20 pages).
Office Action dated Dec. 31, 2015 for U.S. Appl. No. 14/755,546.
Notice of Allowance dated Jan. 29, 2016 for U.S. Appl. No. 14/755,546.
English translation of First Office Action for Taiwanese Application No. 101121656, dated Nov. 13, 2015.
Singapore Notice of Eligibility for Grant, Search Report, and Examination Report dated Dec. 10, 2015 for Singapore Application No. 11201503336V.
Office Action dated Jan. 11, 2016 for U.S. Appl. No. 14/161,328.
Office Action dated Jun. 30, 2016 for U.S. Appl. No. 14/106,276.
Australian First Patent Examination Report for Application No. 2012363114, dated Jun. 15, 2016, 4 pages.
Office Action for Chinese Patent Application No. 201380064860.5, dated Jun. 2, 2016 including English language summary, 13 pages.
Singapore Office Action and Written Opinion dated May 26, 2016 for Singapore Application No. 11201504333Y.
Singapore Office Action and Written Opinion dated May 27, 2016 for Singapore Application No. 11201504330U.
Singapore Office Action and Written Opinion dated May 27, 2016 for Singapore Application No. 11201504327V.
Office Action dated Mar. 10, 2016 for U.S. Appl. No. 14/620,073.
Notice of Acceptance dated Jun. 10, 2016 for Australian Application No. 2012302251.
Extended European Search Report for European Application No. 13863308.6 dated Jul. 19, 2016, 8 pages.
Office Action dated Aug. 11, 2016 for U.S. Appl. No. 14/108,110.
Chinese Office Action dated Aug. 3, 2016 for Chinese Patent Application 201480007369.3 13 pages.
Office Action dated Sep. 1, 2016 for U.S. Appl. No. 14/106,212.
Australian First Patent Examination Report for Application No. 2013359097 dated Aug. 26, 2016, 3 pages.
British Examamination Report for GB Application No. GB1400762.9, dated Aug. 8, 2016, 2 pages.
Extended European Search Report for European Application No. 13863546.1 established Jul. 12, 2016, 7 pages.
Office Action dated Aug. 9, 2016 for U.S. Appl. No. 14/108,142.

(56) References Cited

OTHER PUBLICATIONS

Jacoby, Philip, "Recent Insights on the Use of Beta Nucleation to Improve the Thermoforming Characteristics of Polypropylene," Society of Plastics Engineers, Annual Technical Conference Proceedings, ANTEC 2012, Apr. 2012, pp. 2292-2296.
Singapore Written Opinion for Singapore Patent Application No. 11201504756T established Jul. 19, 2016, 7 pages.
Office Action dated Sep. 27, 2016 for U.S. Appl. No. 14/725,319.
Taiwan Office Action for Taiwan Pat. App. No. 102146299 received on Oct. 21, 2016, 7 pages.
Third Party Observation filed in European Patent App. No. 12727994.1 received on Nov. 4, 2016, 11 pages.
International Standard ISO 16790:2005(E), 20 pages.
S. Muke et al., The Melt Extensibility of Polypropylene, Polym. Int. 2001,515-523, 9 pages.
P. Spitael and C.W. Macosko, Strain Hardening in Polypropylenes and its Role in Extrusion Foaming, Polym. Eng. Sci. 2004, 2090-2100.
Combined Search and Examination Report for Great Britain App. No. GB1616321.4 dated Oct. 12, 2016, 4 pages.
British Examination Report for GB App. No. 1400762.9 dated Oct. 12, 2016, 2 pages.
Chinese Office Action for Chinese Applicaiton 201380065781.6 dated Oct. 18, 2016, 33 pages.
Research Progress of Polypropylene Foamed Material, Baiquan Chen et al., Plastics Manufacture, No. 12, pp. 55-58.
Modification and Formulation of Polypropylene, Mingshan Yang edits, Chemical Industry Press, p. 43, the second paragraph from the bottom, Jan. 31, 2009.
Extended European Search Report for European App. No. 13863649.3 dated 27 Sep. 16, 9 pages.
Office Action dated Nov. 4, 2016 for U.S. Appl. No. 13/961,411.
Chinese Office Action for Chinese Application No. 201280051426.9 dated Nov. 1, 2016, 9 pages.
English Summary of Chinese Office Action for Application Serial No. 201380041896.1, dated Nov. 11, 2016, 11 pages.
Extended European Search Report for European App. No. 14775300.8 dated 24 Oct. 16, 9 pages.
Office Action dated Nov. 18, 2016 for U.S. Appl. No. 14/718,836.
Typical Engineering Properties of Polypropylene information sheet, Ineos Olefins and Polymers USA, archived at https://web.archive.org/web/20160501000000*/http://www.ineos.com/globalassets/ineos-group/businesses/ineos-olefins-and-polymers-usa/products/technical-information-patents/ineos-engineering-properties-of-pp.pdf, Mar. 2016, p. 1.
Office Action dated Dec. 14, 2016 for U.S. Appl. No. 14/211,553.
Office Action dated Dec. 22, 2016 for U.S. Appl. No. 14/858,158.
Gulf Cooperation Council Examination Report for GCC Patent App. No. GC2012-21529 received on Nov. 14, 2016, 6 pages.
Office Action dated Dec. 28, 2016 for U.S. Appl. No. 14/106,276.
Office Action dated Jan. 4, 2017 for U.S. Appl. No. 14/108,110.
Spanish Search Report for Spanish App. No. 201490025 dated Dec. 23, 2016, 5 pages.
Japanese Office Action for Japanese Patent App. 2014-516089 dated Dec. 20, 2016, 6 pages.
European Examination Report for European App. No. 12727994.1 dated Jan. 25, 2016, 4 pages.
English translation of Japanese Office Action for Japanese Application No. 2014-516089, dated May 10, 2016.
Third Party Submission Under 37 CFR 1.290 filed on May 12, 2016 in U.S. Appl. No. 14/739,510.
Daploy HMS Polypropylene for Foam Extrusion, 20 pages, BOREALIS Borouge Shaping the Future with Plastics, Published 2010, www.borealisgroup.com, www.borouge.com, Vienna, Austria.
Lugao, A.B. et al., HMSPP—New Developments, Chemical and Environmental Technology Center, IPEN—Progress Report, 2002-2004 (1 page).
Davesh Tripathi, Practical Guide to Polypropylene, 2002 (5 pages).

Jinghua Tian et al., The Preparation and Rheology Characterization of Long Chain Branching Polypropylene, Polymer, 2006 (9 pages).
Bc. Lukas Kovar, High Pressure Crystallization of Long Chain Branched Polypropylene, Master Thesis, Thomas Bata University in Zlin, 2010 (83 pages).
Office Action for Chinese Patent Application No. 201380065116.7, dated Jun. 28, 2016, including English language summary, 12 pages.
Australian First Patent Examination Report for Application No. 2013334155, dated May 23, 2016, 4 pages.
Extended European Search Report for European Application No. 13862331.9-1708 / 2931627 PCT/US2013/074923, dated Jul. 7, 2016.
English translation of Russian Office Action for Application Serial No. 2014101298, dated Jul. 22, 2016, 7 pages.
Japanese Office Action for Japanese App. No. 2014-528384 received Dec. 6, 2016, 15 pages.
Singapore Office Action and Written Opinion dated Feb. 6, 2017 for Singapore Application No. 11201504330U, 6 pages.
Office Action dated Feb. 7, 2017 for U.S. Appl. No. 13/491,007.
Office Action for Chinese Patent Application No. 201380064860.5, dated Jan. 25, 2017, 12 pages.
European Examination Report for European App. No. 13849152.7 dated Jan. 30, 2017, 3 pages.
Office Action dated Feb. 15, 2017 for U.S. Appl. No. 14/858,193.
Singapore Office Action and Written Opinion dated Feb. 14, 2017 for Singapore Application No. 11201504327V, 6 pages.
Office Action dated Jun. 7, 2017 for U.S. Appl. No. 15/388,319; (pp. 1-21).
Chinese Office Action for Chinese Application No. 201280051426.9 dated May 15, 2017, 12 pages.
Chinese Office Action for Chinese App. No. 201380041896.1 dated May 22, 2017, 9 pages.
Taiwan Office Action for Taiwan App. No. 101121655 dated Jun. 14, 2017, 29 pages.
Australian Examiner's Report for Australian App. No. 2014244210 dated Jun. 16, 2017, 4 pages.
European Examination Report for European App. No. 13863308.6 dated May 17, 2017, 3 pages.
Extended European Search Report for European App. No. 14836418.5 dated Jun. 6, 2017, 14 pages.
Office Action dated Jun. 13, 2017 for U.S. Appl. No. 14/858,193; (pp. 1-21).
Japanese Office Action for Japanese Patent App. No. 2015-539838 dated Jun. 6, 2017, 19 pages.
Office Action dated Apr. 7, 2017 for U.S. Appl. No. 14/063,252.
Chinese Office Action for Chinese Application No. 201380065127.5 dated Apr. 1, 2017, 14 pages.
Japanese Office Action for Japanese Application No. 2014-515882, dated Apr. 4, 2017, 6 pages.
New Zealand Examination Report for New Zealand Application No. 708552 dated Mar. 29, 2017, 2 pages.
Australian Search Report for Australian App. No. 2013359028, dated Apr. 10, 2017, 5 pages.
Australian Search Report for Australian App. No. 20133358988 dated Apr. 11, 2017, 4 pages.
Chinse Office Action for Chinese Patent App. No. 201511030247.9 dated Apr. 5, 2017, 12 pages.
Office Action dated Feb. 28, 2017 for U.S. Appl. No. 15/004,263.
Office Action dated Mar. 6, 2017 for U.S. Appl. No. 14/108,142.
Chinese Office Action for Chinese App. No. 201480052411.3 dated Feb. 28, 2017, 16 pages.
New Zealand First Examination Report for New Zealand Application 708546 dated Feb. 23, 2014, 2 pages.
Singapore Office Action and Written Opinion dated Dec. 13, 2016 and received on Feb. 28, 2017 for Singapore Application No. 11201504333Y, 6 pages.
Office Action for Chinese Patent Application No. 201380065116.7, dated Mar. 1, 2017, 9 pages.
Office Action dated Mar. 15, 2017 for U.S. Appl. No. 14/106,212.
Office Action dated Mar. 17, 2017 for U.S. Appl. No. 14/106,276.
Chinese Office Action dated Mar. 10, 2017 for Chinese Patent Application 201480007369.3, 11 pages.

(56) References Cited

OTHER PUBLICATIONS

New Zealand Examination Report for New Zealanc Application No. 708463 dated 16 Mar. 17, 3 pages.
Office Action dated Mar. 24, 2017 for U.S. Appl. No. 14/506,906.
Office Action dated Mar. 30, 2017 for U.S. Appl. No. 15/137,657.
Supplemental European Search Report for European App. No. 14836418 dated Feb. 23, 2017, 6 pages.
Chinese Office Action for Chinese App. No. 201380065089.3 dated Apr. 21, 2017, 10 pages.
Applied Plastics Engineering Handbook, 1st edition, edited by Myer Kutz, published Jul. 20, 2011, 2 pages.
Chinese Office Action for Chinese App. No. 201380065781.6 dated May 10, 2017, 11 pages.
German Office Action for German App. No. 11 2012 002 042.1 dated Sep. 8, 2017, 20 pages.
Chinese Office Action dated Sep. 21, 2017 for Chinese Patent Application 201480007369.3, 4 pages.
New Zealand Examination Report for New Zealand Application 708546 dated Jul. 11, 2017, 2 pages.
Office Action dated Jul. 19, 2017 for U.S. Appl. No. 15/004,263; (pp. 1-17).
European Examination Report for European App. No. 13849152.7 dated Jun. 29, 2017, 4 pages.
Taiwan Office Action for Taiwan App. No. 102138786 dated Aug. 9, 2017, 25 pages.
Australian Examination REport for Australian App. No. 2016204692 dated Aug. 15, 2017, 3 pages.
Office Action dated Nov. 2, 2017 for U.S. Appl. No. 15/650,424; (pp. 1-6).
Chinese Office Action for Chinese Application No. 201380065127.5 dated Sep. 27, 2017, 19 pages.
Office Action dated Oct. 26, 2017 for U.S. Appl. No. 15/139,573; (pp. 1-8).
Extended European Search Report for European App. No. 17182869.2 dated Oct. 19, 2017, 5 pages.
Extended European Search Report for European App. No. 17181231.6 dated Nov. 7, 2017, 5 pages.
Office Action dated Nov. 14, 2017 for U.S. Appl. No. 14/862,552; (pp. 1-14).
"All You Need to Know About Polypropylene, Part 1," Creative Mechanisms Blog. (Year: 2016).
Rejection Decions for Chinese Patent App. No. 201280051426.9 received on Nov. 14, 2017, 8 pages.
ASTM D883-17, an American Society for Testing and Materials "Standard Terminology Relating to Plastics," 2017, 16 pages.
ASTM D4101-14, an American Society for Testing and Materials "Standard Standard Specification for Polypropylene Injection and Extrusion Materials," 2014, 17 pages.
Lyondellbasell, Polypropylene, Impact Copolymer, https://www.lyondellbasell.com/en/products-technology/polymers/resin-type/polypropylene-impact-copolymer/, accessed on Nov. 29, 2017, 5 pages.
ASTM D883-12e1, an American Society for Testing and Materials "Standard Terminology Relating to Plastics," 2012, 16 pages.
ASTM D4101-11, an American Society for Testing and Materials "Standard Standard Specification for Polypropylene Injection and Extrusion Materials," 2011, 17 pages.

\* cited by examiner

US 9,957,365 B2

CELLULAR POLYMERIC MATERIAL

PRIORITY CLAIM

This application claims priority under 35 U.S.C. § 119(e) to U.S. Provisional Application No. 61/779,951, filed Mar. 13, 2013, which is expressly incorporated by reference herein.

BACKGROUND

The present disclosure relates to polymeric materials that can be formed to produce a container, in particular polymeric materials that insulate. More particularly, the present disclosure relates to morphology and crystalline structure of cellular polymeric material that can be transformed into usable articles, such as insulated containers.

SUMMARY

An insulated container in accordance with the present disclosure, which may be a drink cup or a food-storage cup (e.g.), is manufactured from a sheet extrudate or tubular extrudate produced in an extrusion process. In illustrative embodiments, the extrudate is a cellular polymeric material.

In illustrative embodiments, an insulative container in accordance with the present disclosure is manufactured from a tubular extrudate produced in an extrusion process. In illustrative embodiments, the extrudate is an insulative cellular polypropylene-based material configured to provide resistance to creasing and/or wrinkling during cup convolution or shaping.

In illustrative embodiments, the cell morphology of an extruded sheet of insulative cellular polypropylene-based material in accordance with the present disclosure is a function of the extrusion angle, which has an effect on the quality of an article, such as an insulative container, formed therewith. In particular, cell morphology is affected by the angle at which a polypropylene-based material in accordance with the present disclosure exits an enclosed die volume through an extruder die lips, and is related to a reduction in, if not an elimination of, deep creases and/or wrinkles inside the formed article.

In illustrative embodiments, the cell morphology of an extruded sheet of insulative cellular polypropylene-based material in accordance with the present disclosure is a function of formulation and process conditions, which conditions have an effect on the quality of an article, such as an insulative container, formed therewith. In particular, the effects of such conditions on cell density and cell dimensional attributes, and ultimately on crease/wrinkle resistance, results in a wrinkle-resistance prediction model based on power law regression.

In illustrative embodiments, the cell aspect ratio of an extruded sheet of insulative cellular polypropylene-based material in accordance with the present disclosure has an effect on the wrinkle resistance of that material during mechanical convolution. Parameters such as cell density and aspect ratio ultimately determine control limits that result in a wrinkle-resistance model for the extruded sheet.

In illustrative embodiments, the machine direction cell aspect ratio of an extruded sheet of insulative cellular polypropylene-based material in accordance with the present disclosure has a greater effect than the cell aspect ratio in the cross-web direction on the wrinkle resistance of that material during mechanical convolution.

In illustrative embodiments, the orientation of an extruded sheet of insulative cellular polypropylene-based material in accordance with the present disclosure has an effect on the wrinkle resistance of that material during mechanical convolution. In particular, when formed into a circular article, the sheet should be oriented such that the circumference of the circular article represents −45° to +45° parallel to the direction of flow for the material of the sheet. The effects of parameters such as sheet orientation in formed circular articles ultimately influence their wrinkle-resistance capability.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which.

DETAILED DESCRIPTION

Figure 1:
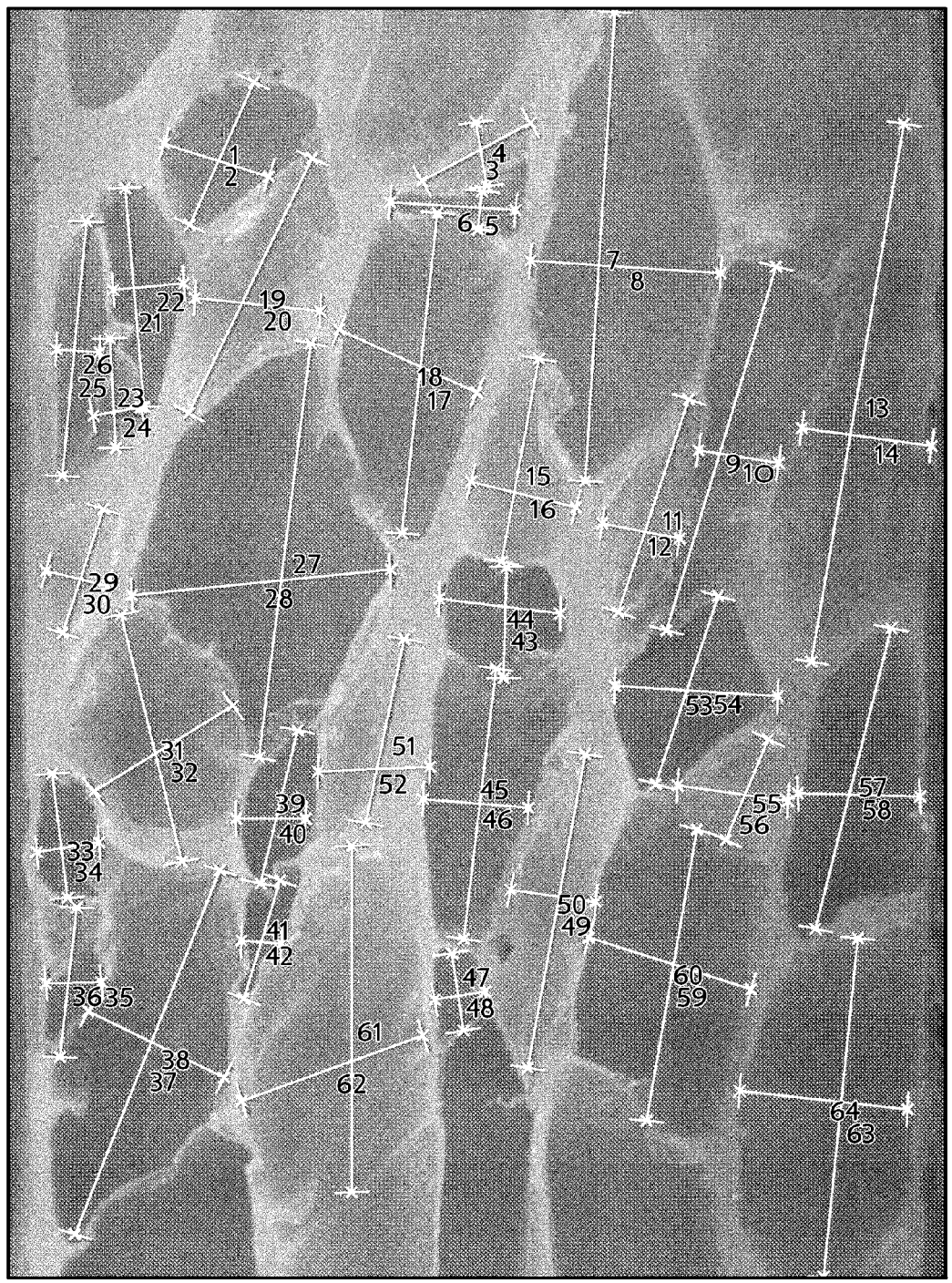
FIG. 1 is a microscopy image of a 44°-extruded sheet strip from an insulative cellular polypropylene-based material of the present disclosure used to quantify dimensional morphology of cell length and width.

An unexpected feature of exemplary embodiments of an extruded sheet of insulative cellular polypropylene-based material in accordance with the present disclosure is the ability of the sheet to form a noticeably crease-free and wrinkle-free surface when curved to form a round article, such as an insulative cup. The surface is wrinkle-free even inside the cup, where compression forces typically cause material to crush and/or crease easily, especially for low density material with a large cell aspect ratio. In exemplary embodiments, the surface profile of an extruded sheet of insulative cellular polypropylene-based material as detected by microscopy is such that the depth of the indentations (i.e., creases and/or wrinkles) naturally occurring in the outside and inside of the cup surface when it is subject to extension and compression forces during cup forming may be less than about 100 microns. In one exemplary embodiment, the surface profile may include indentations of less than about 50 microns. In another exemplary embodiment, the surface profile may include indentations of about 5 microns or less. At a depth of about 10 microns and less, micro-wrinkles and/or creases on a cup surface are ordinarily not visible to the naked eye.

In one exemplary embodiment, an insulative cup formed from a sheet comprising a skin and a strip of insulative cellular polypropylene-based material in accordance with the present disclosure had typical creases (i.e., deep wrinkles) about 200 microns deep extending from the top of the cup to the bottom of the cup. In another exemplary embodiment, an insulative cup formed from a sheet comprising a strip of insulative cellular polypropylene-based material only (without a skin) in accordance with the present disclosure had typical creases about 200 microns deep extending from the top of the cup to the bottom of the cup. Such creases with depths from about 100 microns to about 500 microns are typically formed inside of a cup undergoing compression. Creases and deep wrinkles may present a problem of unsatisfactory surface quality making cups with such surface features unusable or undesirable. Creases may form in instances where sheets include a skin or exclude a skin.

It was unexpectedly found that the cell morphology of an extruded sheet of insulative cellular polypropylene-based material in accordance with the present disclosure has an effect on the quality of the formed article, such as an insulative cup. The effects of cell morphology on wrinkle resistance in insulative cellular polypropylene-based material can be illustrated through examining the effect of varying an extruder die lips angle. In exemplary embodiments, the angle at which insulative cellular polypropylene-based material in accordance with the present disclosure exits an enclosed volume may affect the material's wrinkle resistance. It was found that for a specified formulation of insulative cellular polypropylene-based material and specified cup forming conditions, different die exit angles lead to noticeably different levels of creasing and/or wrinkling in article surfaces during extruded sheet convolution. The two geometric exit angles selected for examination in the present disclosure are those commonly used in polyethylene foam production, i.e., an exit angle of 90°, and in polystyrene foam production, i.e., an exit angle of 44° (see, Example 1).

In exemplary embodiments, insulative cellular polypropylene-based material in accordance with the present disclosure may be extruded as sheet. Microscopy images show that distinct cell morphology exists, i.e., cell structure distinctions, within such an extruded sheet when one sheet is produced with a higher curvature die exit angle and the other with a lower curvature die exit angle. When the resulting sheets are cut in the cross direction and machine direction and examined under a microscope, the difference in cell morphology between the two sheets can be detected.

Direct evidence of polymer cell structure is provided by microscopy studies. There is a close relationship between the regularity of molecular structure and malleability. Cell morphology describes polymer cell density, cell structure, cell wall thickness, cell shape, and cell size distribution of cells. Polymer cell structures may have the same general shape and appearance, being composed predominantly of ovular cells, and the same log normal cell distribution, but possess a different cell aspect ratio and cell wall thickness. Illustratively, cell aspect ratio is the ratio between lengths of the ovular polymer cells to widths of the ovular polymer cells. Illustratively, cell wall thickness is the solid polymeric distance between individual polymer cells.

In one exemplary embodiment, an extruded sheet of insulative cellular polypropylene-based material in accordance with the present disclosure may exit from an enclosed die volume at an angle of 90°. In another exemplary embodiment, an extruded sheet of insulative cellular polypropylene-based material may exit from an enclosed die volume at an angle of 44°. Illustratively, an extruded sheet of insulative cellular polypropylene-based material may exit from an enclosed die volume at an angle between 44° and 90°. Two such sheets, one produced at an exit angle of 44° and the other at an exit angle of 90°, can be prepared as strips either in the machine direction or in the cross direction and analyzed with digital microscopy. Cell density, cell distribution, cell shape, cell aspect ratio, and cell wall thickness of an extruded sheet can be held constant when extrusion parameters such as recipe, temperature, and cooling rate are the same. In the present disclosure, formation of wrinkled material was found to occur when the exit angle of curvature increased from 44° to 90° (see, Example 1, FIGS. 1-3). Without wishing to be bound by theory, one plausible explanation may be that cell density and dimensional morphology are a function of enclosed die volume exit angle, i.e., cell density and dimensional morphology may be altered upon exit from different enclosed die volume exit angles, thereby creating wrinkled material. Because production of insulative cellular polypropylene-based material with $CO_2$ as a blowing agent is still in industrial infancy and development, the present disclosure provides a basis for new process development involving the use of die angle geometries and their effect on cell morphology.

It was unexpectedly found that cell morphology, especially cell density, of an extruded sheet of insulative cellular polypropylene-based material in accordance with the present disclosure has an effect on the quality of the formed article, such as a cup, formed therewith. The effects of cell density and dimensional attributes on wrinkle resistance in insulative cellular polypropylene-based material can be illustrated through examining cell morphology data from different formulations and process conditions, thus creating a wrinkle-resistance prediction model based on power law regression.

In exemplary embodiments, the cell density of insulative cellular polypropylene-based material in accordance with the present disclosure may affect the material's resistance to wrinkling. In other exemplary embodiments, the total cell number of insulative cellular polypropylene-based material may affect the material's wrinkle resistance to wrinkling. In other exemplary embodiments, the cell aspect ratio in the machine direction, i.e., the direction parallel to the flow of insulative cellular polypropylene-based material, may affect the material's resistance to wrinkling. In other exemplary embodiments, the cell aspect ratio in the cross direction, i.e., the direction perpendicular to the flow of insulative cellular polypropylene-based material, may affect the material's resistance to wrinkling. In other exemplary embodiments, the overall cell length of insulative cellular polypropylene-based material may affect the material's resistance to wrinkling. In other exemplary embodiments, the overall cell thickness of insulative cellular polypropylene-based material may affect the material's resistance to wrinkling. In other exemplary embodiments, the cell length of insulative cellular polypropylene-based material may affect the material's resistance to wrinkling. In other exemplary embodiments, the cell width of insulative cellular polypropylene-based material may affect the material's resistance to wrinkling. In other exemplary embodiments, the cell wall thickness of insulative cellular polypropylene-based material may affect the material's resistance to wrinkling. In other exemplary embodiments, cell dimensional attributes may follow a power law that is independent of formula and processing conditions (see, Example 2, FIGS. 8-15). Accordingly, although production of insulative cellular polypropylene-based material with $CO_2$ as a blowing agent is still in industrial infancy and development, the present disclosure also provides process know how and a basis for predicting wrinkle resistance in insulative cellular polypropylene-based material that is independent of material formula and processing conditions.

The insulative cellular polypropylene-based material of the present disclosure satisfies a long-felt need for a material that can be formed into an article, such as an insulative cup, that includes the features of wrinkle-resistance and crease-resistance as described herein, as well as many, if not all, of the features of insulative performance, recyclability, puncture resistance, frangibility resistance, and microwavability, which features are described in U.S. patent application Ser. Nos. 13/491,007 and 13/491,327 both of which are incorporated herein by reference in their entirety. Others have failed to provide a material that achieves combinations of these features as reflected in the appended claims.

EXAMPLES

The following examples are set forth for purposes of illustration only. Parts and percentages appearing in such examples are by weight unless otherwise stipulated.

Example 1: Formulation, Extrusion, and Sheet Formation

An exemplary formulation used to illustrate the present disclosure is presented below and is described in U.S. Provisional Application Ser. No. 61/719,096, the disclosure of which is hereby incorporated herein by reference in its entirety:

DAPLOY™ WB140 polypropylene homopolymer (available from Borealis A/S) was used as the polypropylene base resin. F020HC, available from Braskem, a polypropylene homopolymer resin, was used as the secondary resin. The two resins were blended with: Hydrocerol™ CF-40E™ as a chemical blowing agent, talc as a nucleation agent, $CO_2$ as a blowing agent, a slip agent, and titanium dioxide as a colorant. Percentages were:

- 81.45% Primary resin: high melt strength polypropylene Borealis WB140 HMS
- 15% Secondary resin: F020HC (Braskem) homopolymer polypropylene
- 0.05% Chemical blowing agent: Clariant Hyrocerol CF-40E™
- 0.5% Nucleation agent: Heritage Plastics HT4HP Talc
- 1% Colorant: Colortech 11933-19 $TiO_2$ PP
- 2% Slip agent: Ampacet™ 102823 Process Aid LLDPE (linear low-density polyethylene), available from Ampacet Corporation The formulation described above was added to an extruder hopper. The extruder heated the formulation to form a molten resin mixture. To this mixture was added 2.2 lbs/hr $CO_2$, which was injected into the resin blend to expand the resin and reduce density. The mixture thus formed was extruded through a die head into a sheet as described in U.S. application Ser. No. 13/491,007, the disclosure of which is hereby incorporated herein by reference in its entirety.

High resolution microscopy may be used to determine the dimensional properties of microcellular polymeric material. The Keyence VHX-1000 Digital Microscope was used to determine the dimensional properties of insulative cellular polypropylene-based material cells of the present disclosure. In one exemplary embodiment, cell length may be the dimensional property denoting maximum distance from top to bottom of cells running parallel to the machine direction. In another exemplary embodiment, cell length may also be the dimensional property denoting maximum distance from top to bottom of cells running parallel to the cross direction. In yet another exemplary embodiment, cell width may be the dimensional property denoting maximum distance from top to bottom of cells running perpendicular to the machine and cross direction. In still another exemplary embodiment, cell wall thickness may be the dimensional property denoting maximum distance between separated cell voids across a line running perpendicular to the machine and cross direction.

Figure 2:
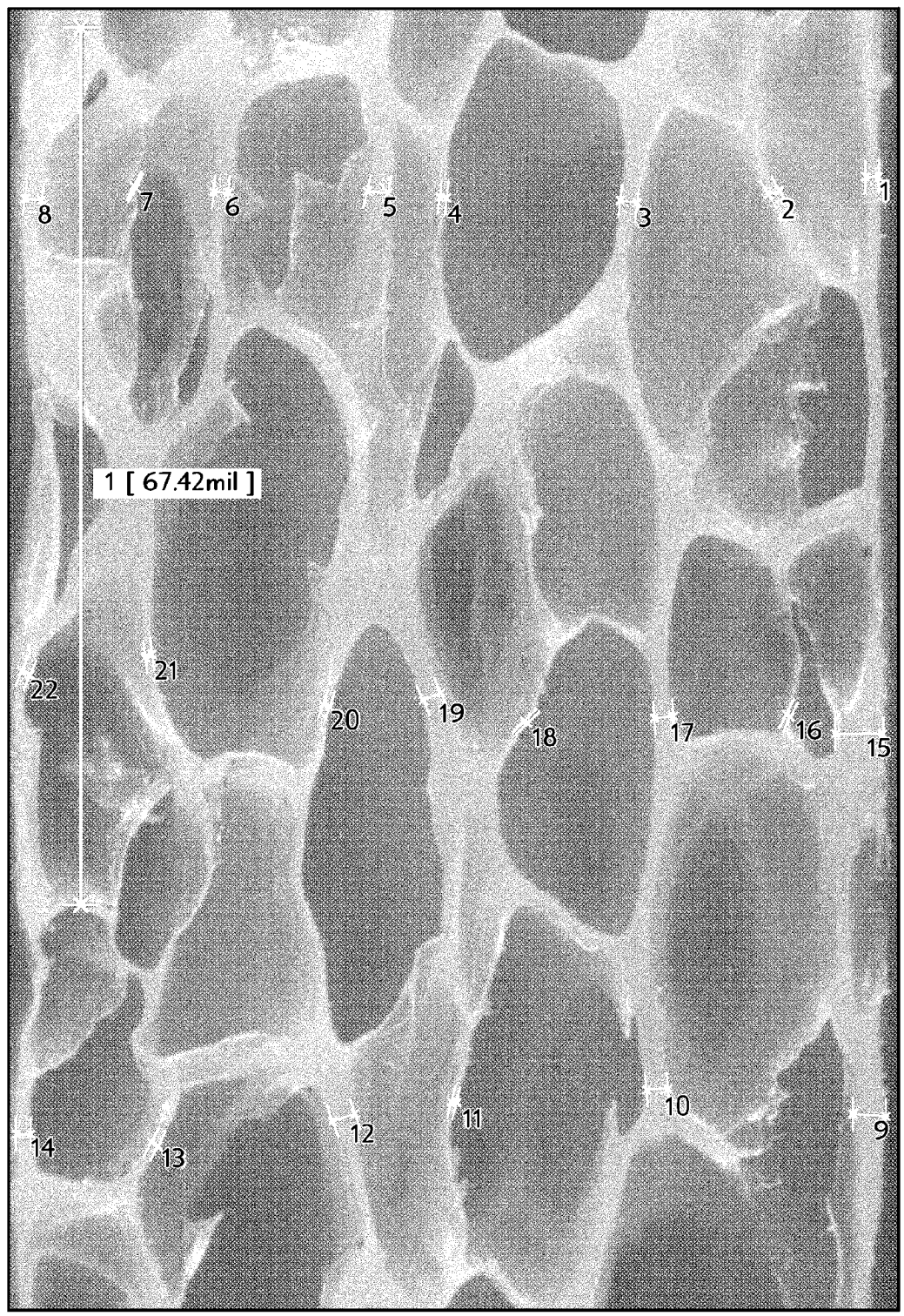
FIG. 2 is a microscopy image of cell wall measurement for a 44°-extruded sheet strip from an insulative cellular polypropylene-based material of the present disclosure used to quantify dimensional morphology.
Figure 3:
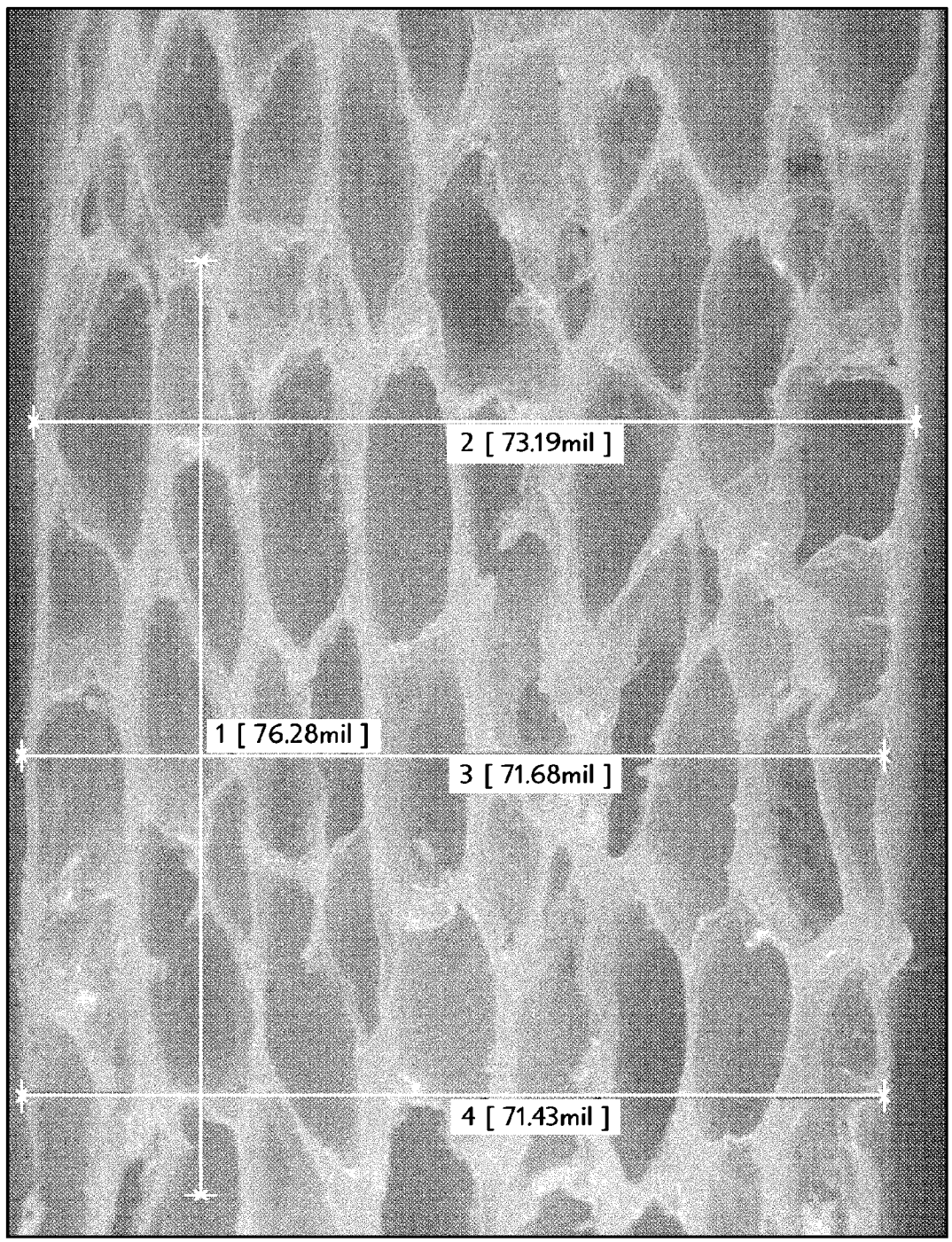
FIG. 3 is a microscopy image of a 90°-extruded sheet strip from an insulative cellular polypropylene-based material of the present disclosure used to quantify dimensional morphology.
Figure 4:
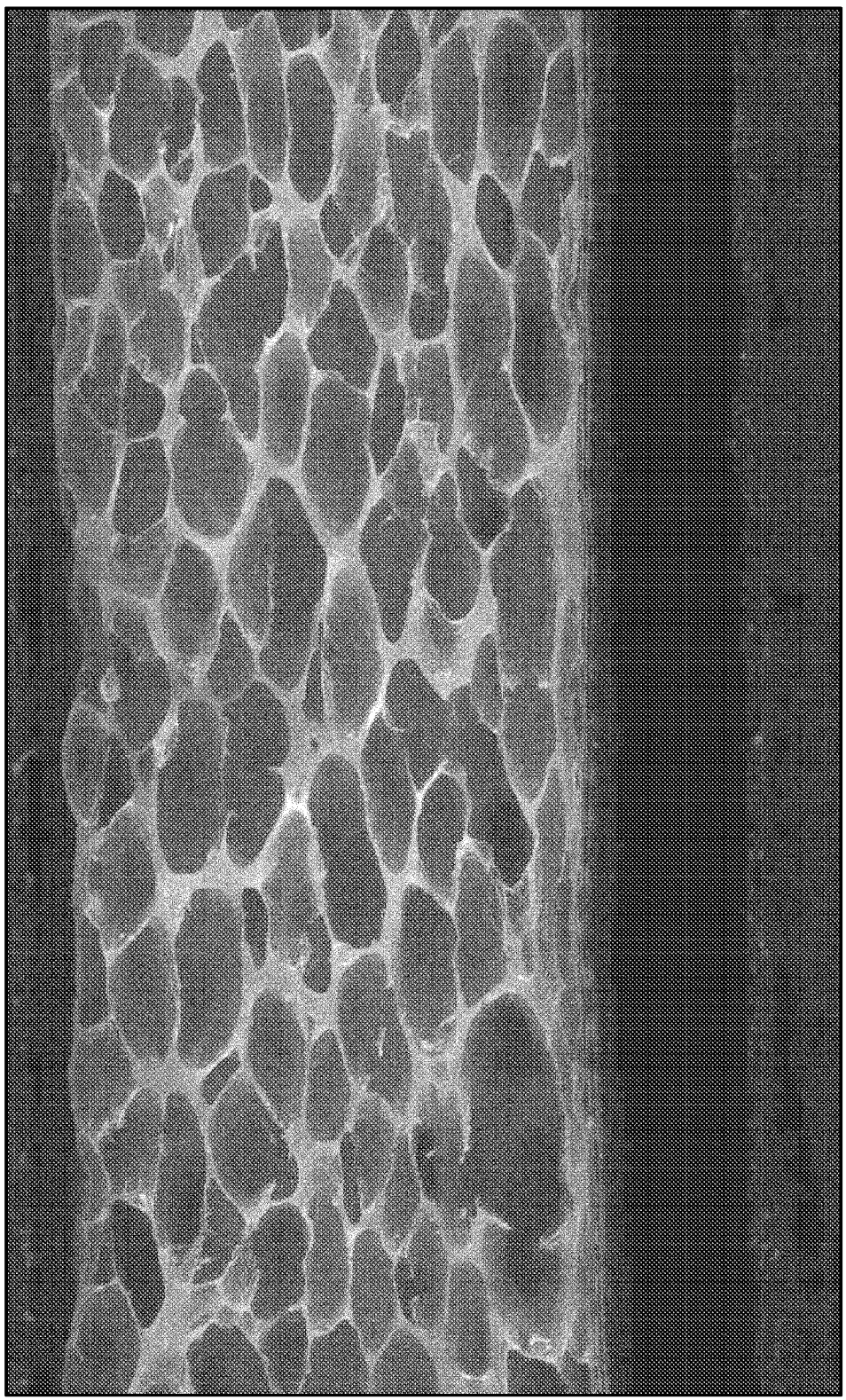
FIG. 4 is an image showing cells with an aspect ratio of about 2.32 and cell density of about 1,216,000 cells/in$^3$, which cells were taken from the CD direction on a convoluted product that demonstrated wrinkle-resistant behavior.
Figure 5:
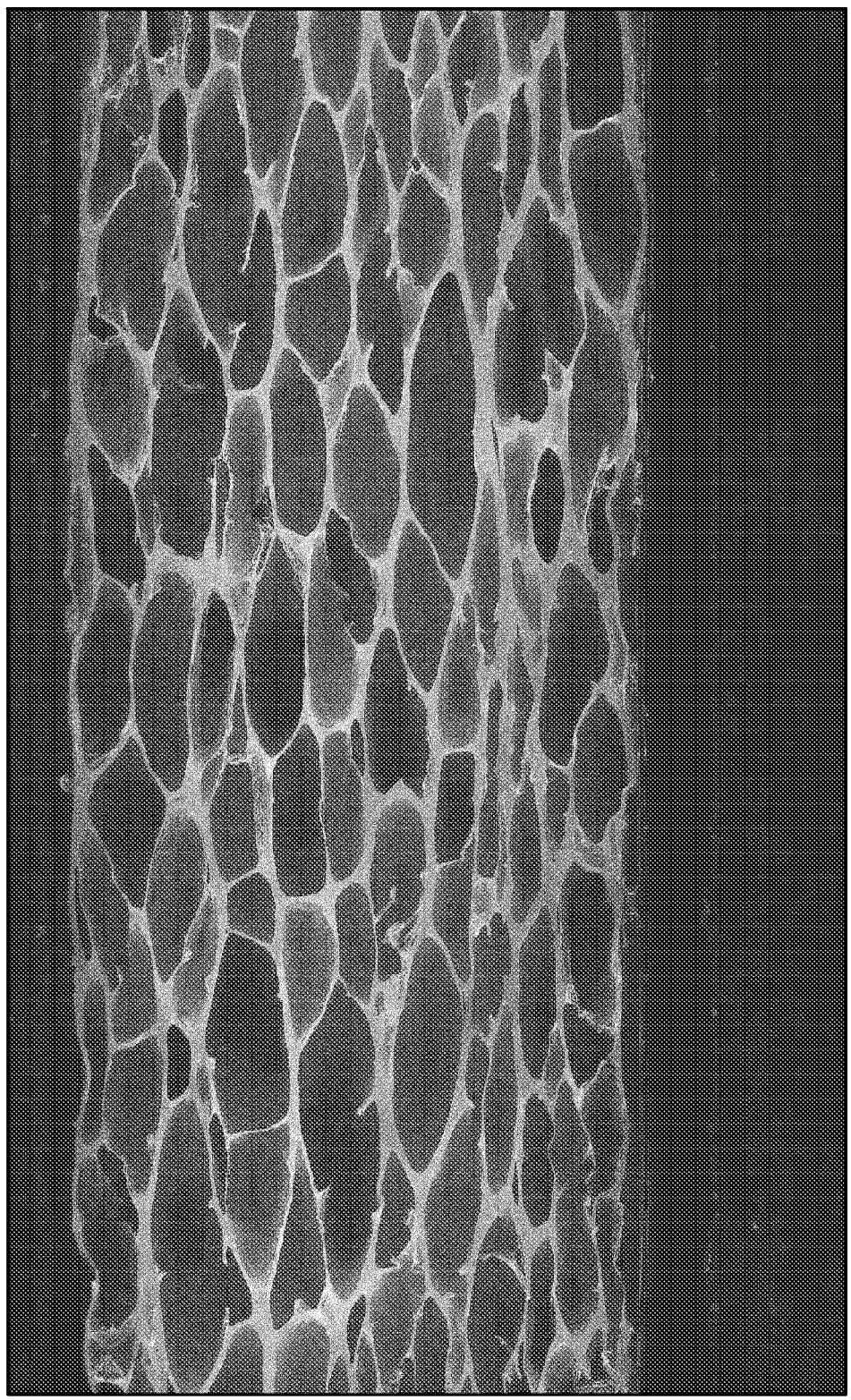
FIG. 5 is an image showing cells with an aspect ratio of about 3.25 and cell density of about 1,159,000 cells/in$^3$, which cells were taken from the CD direction on a convoluted product that demonstrated micro-creasing and macro-creasing behavior.
Figure 6:
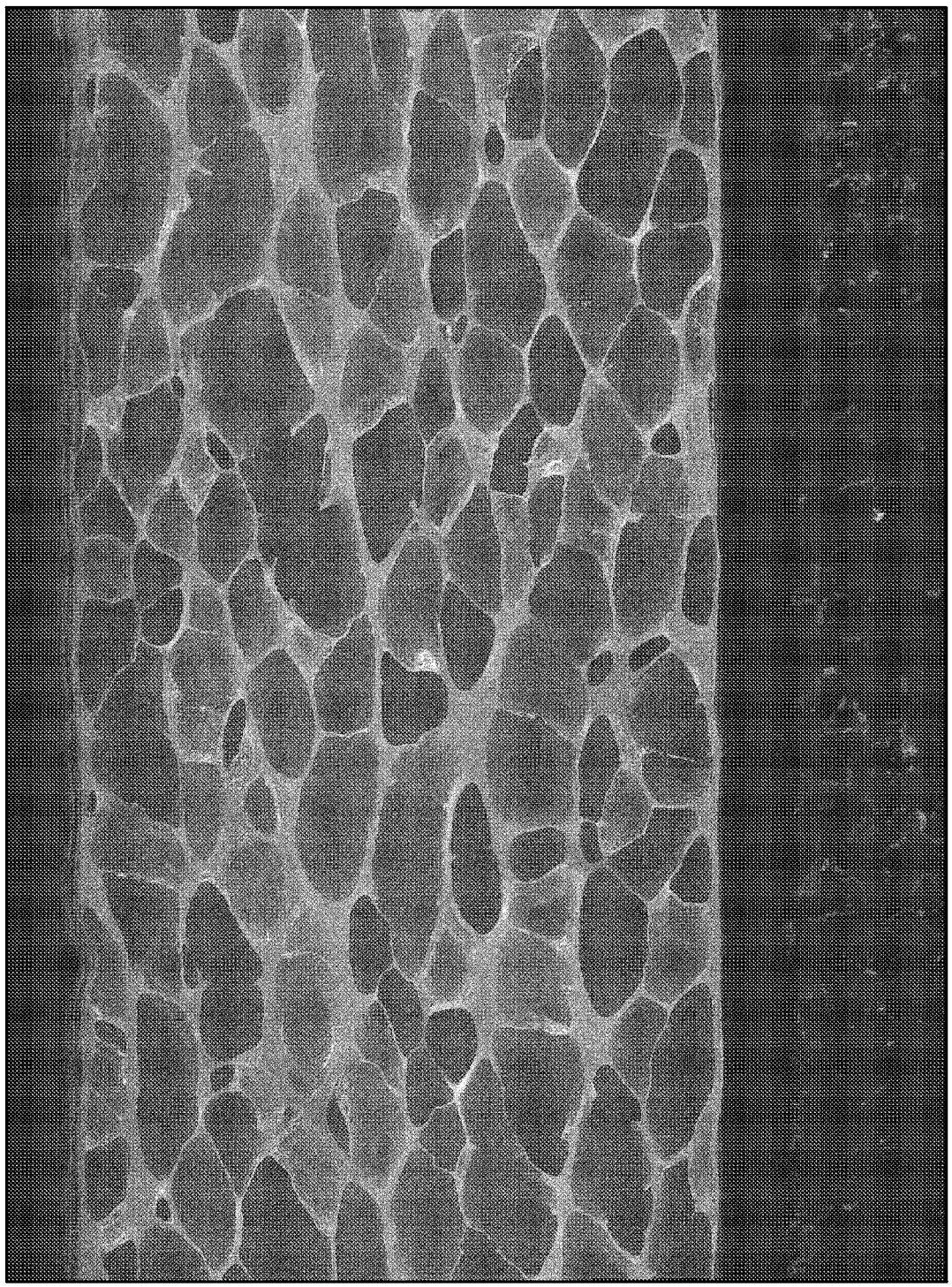
FIG. 6 is an image showing cells with an aspect ratio of about 1.94 and cell density of about 1,631,000 cells/in$^3$, which cells were taken from the MD direction on a convoluted product that demonstrated wrinkle-resistant behavior.
Figure 7:
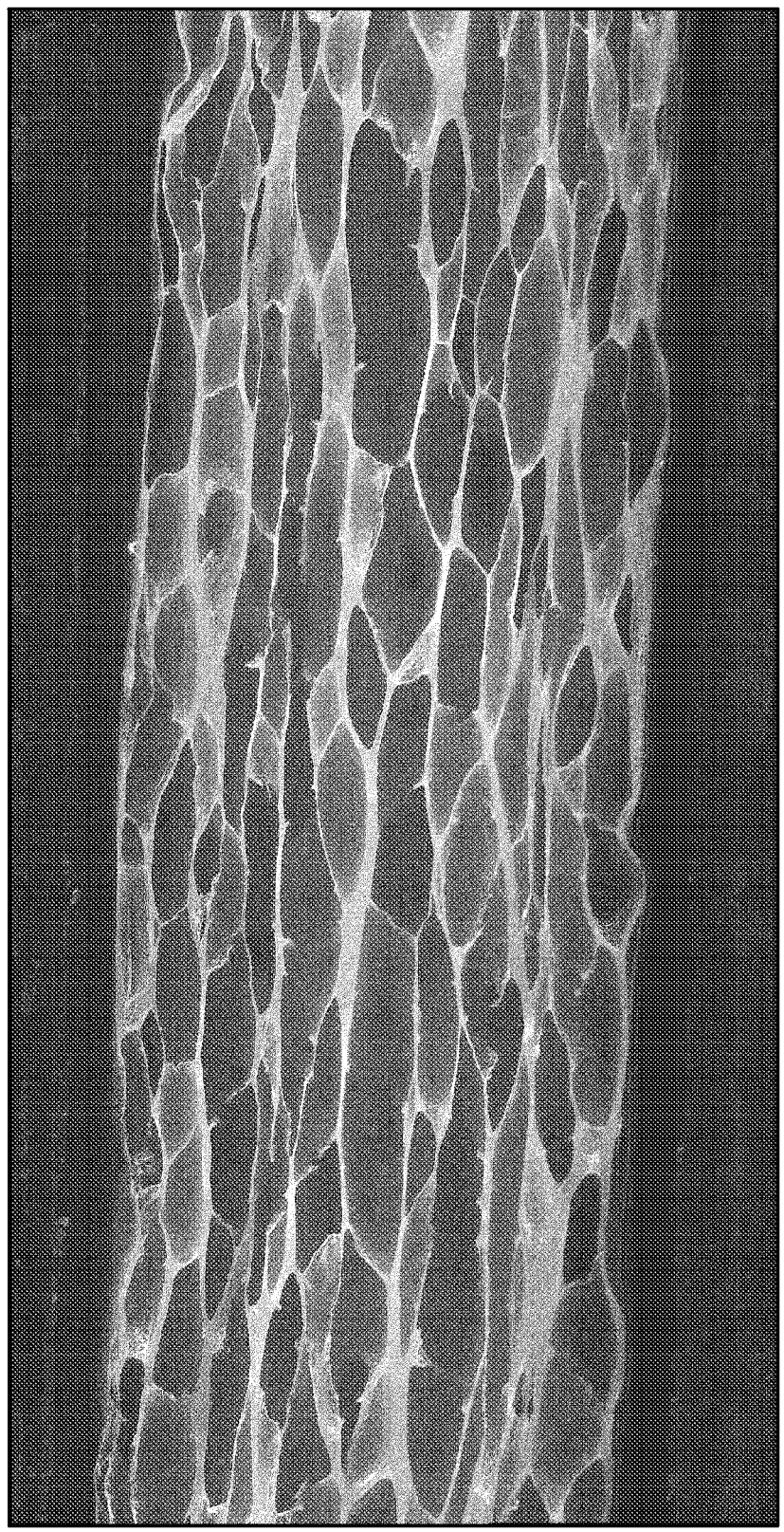
FIG. 7 is an image showing cells with an aspect ratio of about 3.63 and cell density of about 933,000 cells/in$^3$, which cells were taken from the MD direction on a convoluted product that demonstrated micro-creasing and macro-creasing behavior.
Figure 8:
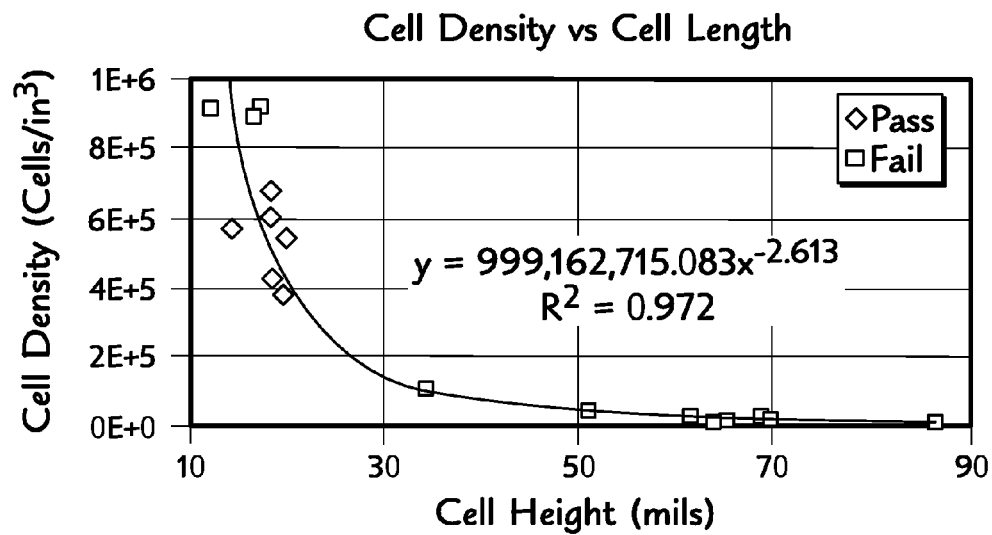
FIG. 8 is a graph with a power law regression fit of cell density vs. cell length in an x-y plot for insulative cellular polypropylene-based materials of the present disclosure where the power law equation for predicting cell length with respect to cell density is $y=999{,}162{,}715.083x^{-2.613}$ and $R^2=0.972$.
Figure 9:
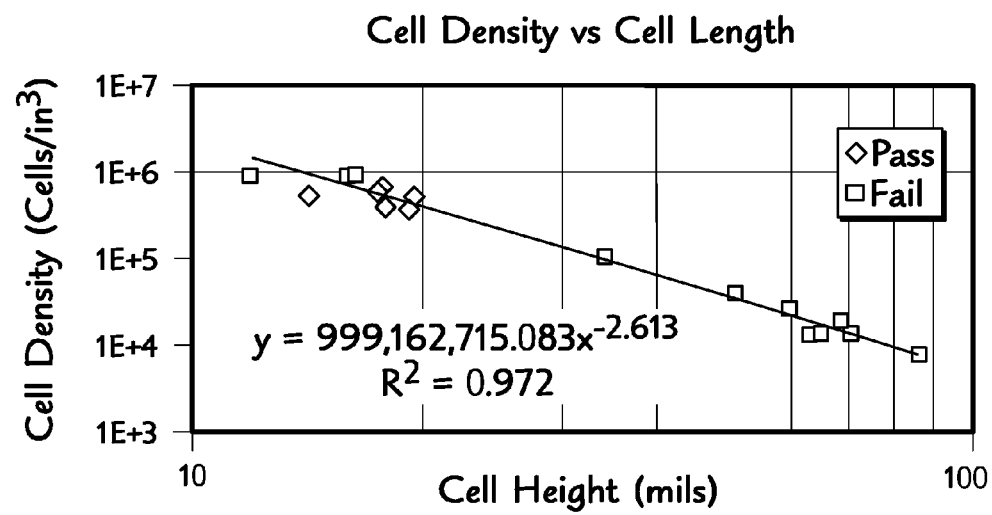
FIG. 9 is a graph with a power law regression fit of cell density vs. cell length in a log-log plot for insulative cellular polypropylene-based materials of the present disclosure where the power law equation for predicting cell length with respect to cell density is $y=999{,}162{,}715.083x^{-2.613}$ and $R^2=0.972$.
Figure 10:
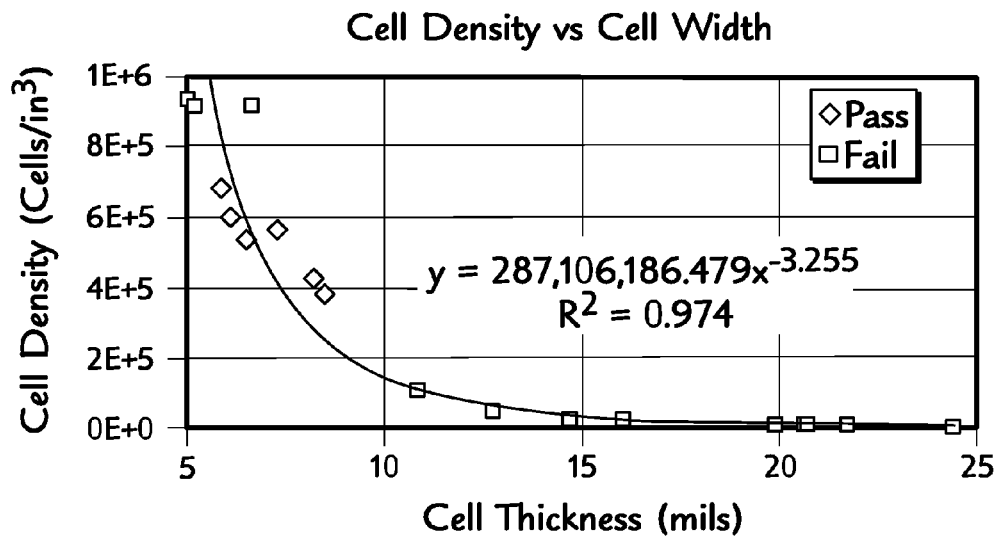
FIG. 10 is a graph with a power law regression fit of cell density vs. cell width in an x-y plot for insulative cellular polypropylene-based materials of the present disclosure where the power law equation for predicting cell width with respect to cell density is $y=287,106,186.479x^{-3.295}$ and $R^2=0.974$.
Figure 11:
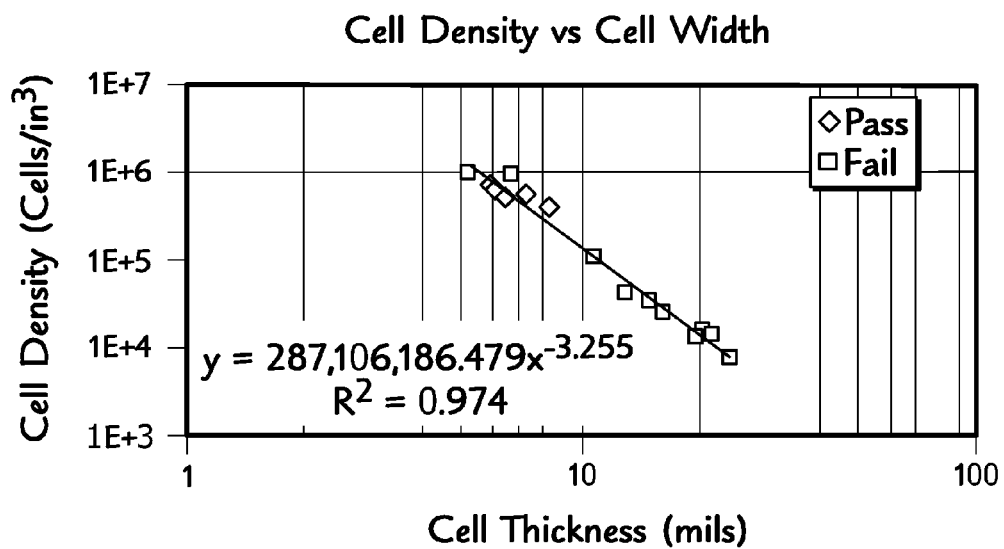
FIG. 11 is a graph with a power law regression fit of cell density vs. cell width in a log-log plot for insulative cellular polypropylene-based materials of the present disclosure where the power law equation for predicting cell with respect to cell density is $y=287,106,186.479x^{-3.295}$ and $R^2=0.974$.

In order to assess the effect of cell morphology of an extruded sheet of insulative cellular polypropylene-based material on the quality of an article formed therewith, such as a cup, a minimum of 700 measurement points were chosen for each of the length and width dimensional properties in order to verify consistency throughout a strip of the material. A minimum of 200 measurement points were chosen for cell wall thickness as a dimensional property in order to verify consistency throughout the strip of insulative cellular polypropylene-based material. In one exemplary embodiment, a sheet of insulative cellular polypropylene-based material may be extruded from an enclosed die volume at an angle of 44°. In another exemplary embodiment, a sheet of insulative cellular polypropylene-based material may be extruded from an enclosed die volume at an angle of 90°. A sheet of insulative cellular polypropylene-based material extruded at an angle of 44° is referred to herein as Material C. A sheet of insulative cellular polypropylene-based material extruded at an angle of 90° is referred to herein as Material D. Strips of insulative cellular polypropylene-based material from 44° and 90° exit angles were quantitatively compared as shown in FIGS. 1-3.

Example 1: Test Method

The typical testing method used for cell morphology measurement was as follows:
1. Cut a strip of insulative cellular polypropylene-based material along the cross direction (CD) and machine direction (MD).
2. Hold the material with a flat clamp and use a razor blade to perform a fine shave.
3. Focus the microscope at 100× and adjust lighting onto the material.
4. Perform length and width measurements of each unique cell in the CD and MD orientation and record values (see, FIG. 1).
5. Perform cell wall thickness measurements across 3-4 tangent lines to overall length of each unique cell in the CD and MD orientation and record the values (see, FIG. 2).
6. Move microscope visual field so the bottom of the most upper incomplete cell is touching the bottom of the screen.
7. Repeat steps 4-5 on each new unique cell until at least 0.500" of the strip is measured.

A sheet of insulative cellular polypropylene-based material produced as described herein typically possessed a density of about 0.1615 g/cm$^3$ and material thickness of about 0.066 inches (1.6764 mm).

Example 1: Test Results

The cell morphology of an extruded sheet of insulative cellular polypropylene-based material exiting the enclosed die volume at angles of 44° and 90° differed greatly in terms of cell height, cell width, cell aspect ratio, and cell wall thickness (see, Table 1). In the machine direction or MD, Material C had an average length of 19.54 mils (49.63 mm), an average width of 8.53 mils (21.67 mm), an average cell wall thickness of 1.02 mils (2.59 mm), and average aspect ratio of 2.29. In the machine direction or MD, Material D had an average length of 17.01 mils (43.21 mm), an average width of 5.22 mils (13.26 mm), an average cell wall thickness of 0.77 mils (1.96 mm), and average aspect ratio of 3.26.

In the cross-web direction or CD, Material C had an average length of 18.45 mils (46.86 mm), an average width of 8.28 mils (21.03 mm), an average cell wall thickness of 0.96 mils (2.44 mm), and average aspect ratio of 2.23. In the cross-web direction or CD, Material D has an average length of 16.43 mils (41.73 mm), an average width of 5.30 mils (13.46 mm), an average cell wall thickness of 0.84 mils (2.13 mm), and average aspect ratio of 3.10.

Moreover, formation of wrinkled insulative cellular polypropylene-based material was found to occur when the exit angle of curvature increased from 44° to 90° (see, Example 1, FIGS. 1-3). Based on these results, it can be concluded that die exit angles from enclosed die volumes create different material morphology, with differing resistance to wrinkling and/or creasing, when recipe and process conditions are held constant. In one exemplary embodiment, wrinkle-resistant insulative cellular polypropylene-based material may be created concomitantly with a decrease in die exit angle. The lower the angle of die exit, the easier it is to control and orient the cell aspect ratio, thus enabling preparation of a sheet of insulative cellular polypropylene-based material that possesses cell aspect ratios close to 1. In exemplary embodiments, die exit angles within an inclusive range of 50°-60° may produce wrinkle-resistant insulative cellular polypropylene-based material. In other exemplary embodiments, die exit angles within an inclusive range of 40°-50° may produce wrinkle-resistant insulative cellular polypropylene-based material. In other exemplary embodiments, die exit angles within an inclusive range of 30°-40° may produce wrinkle-resistant insulative cellular polypropylene-based material. In other exemplary embodiments, die exit angles within an inclusive range of 20°-30° may produce wrinkle-resistant insulative cellular polypropylene-based material. In other exemplary embodiments, die exit angles within an inclusive range of 10°-20° may produce wrinkle-resistant insulative cellular polypropylene-based material. In other exemplary embodiments, die exit angles within an inclusive range of 0°-10° may produce wrinkle-resistant insulative cellular polypropylene-based material. The higher the angle of die exit, the more oriented the cell aspect ratio becomes, especially in the MD direction, i.e., the direction parallel to flow of insulative cellular polypropylene-based material. Without wishing to be bound by theory, lower cell aspect ratios may reduce local stress concentrations that are experienced during convolution of insulative cellular polypropylene-based material, thus leading to wrinkle-resistant and/or crease-resistant material.

TABLE 1

MD and CD Dimensional Attributes of Material C and Material D

| | Cells dimensions [milli inches] | 44° Material C | 90° Material D |
|---|---|---|---|
| MD | Cell length | 19.54 | 17.01 |
| | Cell width | 8.53 | 5.22 |
| | MD Cell Aspect Ratio | 2.29 | 3.26 |
| | Cell Wall Thickness | 1.02 | 0.77 |

TABLE 1-continued

MD and CD Dimensional Attributes of Material C and Material D

| | Cells dimensions [milli inches] | 44° Material C | 90° Material D |
|---|---|---|---|
| CD | Cell length | 18.45 | 16.43 |
| | Cell width | 8.28 | 5.30 |
| | CD Cell Aspect Ratio | 2.23 | 3.10 |
| | Cell Wall Thickness | 0.96 | 0.84 |

Example 2: Formulation, Extrusion, and Sheet Formation

High resolution microscopy may be used to determine the dimensional properties of microcellular polymeric materials. The Keyence VHX-1000 Digital Microscope and Keyence VHX-2000 Digital Microscope were used to determine the dimensional properties of insulative cellular polypropylene-based material cells from the present disclosure.

Nine specified formulations with dissimilar processing conditions (see, Table 2) produced cell dimensional properties that were found to follow a power law model with high accuracy and produce material that may possess wrinkle resistance. The following variables were held constant throughout iterations 1-18: 1° extruder temperature, 2° temperature, extruder speed, sheet pull rate, cooling mandrel diameter, cooling mandrel temperature, and overall die temperature (see, Table 3A). The following variables were altered throughout the aforementioned trial iterations: formula, exit die pressure, die lip angle, die air ring cooling [l/min], and orientation (see, Table 3A). The following variables were held constant throughout iterations 19-45: 1° extruder temperature, extruder speed, sheet pull rate, cooling mandrel diameter, cooling mandrel temperature, and overall die temperature (see, Table 3B). The following variables were altered throughout the aforementioned trial iterations: 2° temperature, exit die pressure, die air ring cooling [l/min], $CO_2\%$, and orientation (see, Table 3B). Iterations 46-50 were conducted in a manner similar to iterations 1-45 in order to investigate the occurrence of creasing during convolution of insulative cellular polypropylene-based material into a circular article (see, Table 3C).

Cross-web direction and machine direction dimensional attributes of 50 different iterations with nine specified formulations were incorporated in the analysis in order to produce data sufficient for high accuracy and precision, as shown in FIGS. 1-3. The specific formulation described above for Example 1 as well as eight other formulations were used to illustrate this aspect of present disclosure (see, Table 2).

TABLE 2

Formulations and Processing Conditions

| Formula # | 1° Resin | 2° Resin | Chemical Blowing Agent | Additive #1 | Additive #2 | Additive #3 | Additive #4 | $CO_2$ (Lbs/Hr) [Table 3B] |
|---|---|---|---|---|---|---|---|---|
| 1 | 81.5% Borealis WB140 HMS | 15% Braskem F020HC | None | 0.5% Heritage Plastics HT4HP Talc | 1% Colortech 11933-19 $TiO_2$-PP | 2% Ampacet ™ 102823 Process Aid | None | 2.2-2.3 |
| 2 | 82.5% Borealis WB140 HMS | 15% Braskem F020HC | None | 0.5% Techmer PM PPM16466 Silica | None | 2% Ampacet ™ 102823 Process Aid | None | 2.2-2.3 |
| 3 | 82.5% Borealis WB140 HMS | 15% Braskem F020HC | None | 0.5% Techmer PM PPM16464 Silica | None | 2% Ampacet ™ 102823 Process Aid | None | 2.2-2.3 |
| 4 | 82.5% Borealis WB140 HMS | 15% Braskem F020HC | None | 0.5% Heritage Plastics HT4HP Talc | None | 2% Ampacet ™ 102823 Process Aid | None | 2.2-2.3 |
| 5 | 81.5% Borealis WB140 HMS | 15% Braskem F020HC | None | 0.5% Heritage Plastics HT4HP Talc | 1% Cell Stabilizer | 2% Ampacet ™ 102823 Process Aid | None | 2.2-2.3 |
| 6 | 81.45% Borealis WB140 HMS | 15% Braskem F020HC | 0.05% Clariant Hydrocerol CF-40E ™ | 0.5% Heritage Plastics HT4HP Talc | 1% Colortech 11933-19 $TiO_2$-PP | 2% Ampacet ™ 102823 Process Aid | None | 2.2-2.4 |
| 7 | 81.45% Borealis WB140 HMS | 15% Braskem F020HC | 0.05% Clariant Hydrocerol CF-40E ™ | 0.5% Techmer PM PPM16466 Silica | 1% Colortech 11933-19 $TiO_2$-PP | 2% Ampacet ™ 102823 Process Aid | None | 2.2-2.4 |
| 8 | 79.95% Borealis WB140 HMS | 15% Braskem F020HC | 0.05% Clariant Hydrocerol CF-40E ™ | 2% Heritage Plastics HT4HP Talc | 1% Colortech 11933-19 $TiO_2$-PP | 2% Ampacet ™ 102823 Process Aid | None | 2.8 |
| 9 | 77.95% Borealis WB140 HMS | 15% Braskem F020HC | 0.05% Clariant Hydrocerol CF-40E ™ | 2% Heritage Plastics HT4HP Talc | 1% Colortech 11933-19 $TiO_2$-PP | 2% Ampacet ™ 102823 Process Aid | 2% Techmer PM PPM16466 Silica | 2.8 |

TABLE 3A

Trial Iterations

| Iteration # | Formula # | Die Pressure [bar] | Cooling L/min | Orientation | Wrinkle |
|---|---|---|---|---|---|
| 1 | 8 | 85 | 1500 | CD | No |
| 2 | 1 | 75 | 0 | MD | Yes |
| 3 | 9 | 85 | 1500 | CD | No |
| 4 | 9 | 85 | 1500 | MD | No |
| 5 | 6 | 86 | 1950 | CD | Yes |
| 6 | 6 | 86 | 1950 | MD | Yes |
| 7 | 6 | 83 | 1440 | CD | No |
| 8 | 6 | 83 | 1440 | MD | No |
| 9 | 7 | 81 | 2000 | CD | No |
| 10 | 7 | 81 | 2000 | MD | No |
| 11 | 3 | 75 | 0 | MD | Yes |
| 12 | 3 | 75 | 850 | MD | Yes |
| 13 | 2 | 75 | 850 | MD | Yes |
| 14 | 2 | 75 | 0 | MD | Yes |
| 15 | 4 | 75 | 0 | MD | Yes |
| 16 | 4 | 75 | 850 | MD | Yes |
| 17 | 5 | 75 | 850 | MD | Yes |
| 18 | 5 | 75 | 0 | MD | Yes |

TABLE 3B

Trial Iterations (continued)

| Iteration # | Formula # | Die Pressure [psi] | Cooling L/min | Secondary Extruder Temp | CO2 % | Orientation | Wrinkle |
|---|---|---|---|---|---|---|---|
| 19 | 1 | 1080-1160 | 1900 | 335 | 2.2 | CD | No |
| 20 | 1 | 1080-1160 | 1900 | 335 | 2.2 | CD | No |
| 21 | 1 | 1080-1160 | 1900 | 335 | 2.2 | CD | No |
| 22 | 1 | 1080-1160 | 1900 | 335 | 2.2 | CD | No |
| 23 | 1 | 1080-1160 | 1900 | 335 | 2.2 | CD | No |
| 24 | 1 | 1050 | 1400 | 330 | 2.2 | CD | Yes |
| 25 | 1 | 1050 | 1400 | 330 | 2.2 | MD | Yes |
| 26 | 1 | 1380 | 2000 | 330 | 2.2 | MD | No |
| 27 | 1 | 1380 | 2000 | 330 | 2.2 | CD | No |
| 28 | 1 | 1380 | 2000 | 330 | 2.2 | MD | No |
| 29 | 1 | 1050 | 2000 | 330 | 2.6 | CD | Yes |
| 30 | 1 | 1050 | 2000 | 330 | 2.6 | MD | Yes |
| 31 | 1 | 1380 | 1400 | 330 | 2.6 | CD | No |
| 32 | 1 | 1380 | 1400 | 330 | 2.6 | MD | No |
| 33 | 1 | 1050 | 2000 | 350 | 2.2 | CD | Yes |
| 34 | 1 | 1050 | 2000 | 350 | 2.2 | MD | Yes |
| 35 | 1 | 1380 | 1400 | 350 | 2.2 | CD | No |
| 36 | 1 | 1380 | 1400 | 350 | 2.2 | MD | No |
| 37 | 1 | 1380 | 1400 | 350 | 2.2 | MD | No |
| 38 | 1 | 1380 | 1400 | 350 | 2.2 | MD | No |
| 39 | 1 | 1380 | 1400 | 350 | 2.2 | MD | No |
| 40 | 1 | 1050 | 1400 | 350 | 2.2 | CD | Yes |
| 41 | 1 | 1050 | 1400 | 350 | 2.2 | CD | Yes |
| 42 | 1 | 1050 | 1400 | 350 | 2.6 | CD | Yes |
| 43 | 1 | 1050 | 1400 | 350 | 2.6 | MD | Yes |
| 44 | 1 | 1380 | 2000 | 350 | 2.2 | CD | No |
| 45 | 1 | 1380 | 2000 | 350 | 2.2 | MD | No |

TABLE 3C

Trial Iterations

| Iteration | Formula | Orientation | Wrinkle |
|---|---|---|---|
| 46 | 1 | MD | No |
| 47 | 1 | MD | No |
| 48 | 1 | MD | Yes |
| 49 | 1 | CD | Yes |
| 50 | 1 | MD | No |

Example 2: Test Method

The typical testing method used for cell morphology measurement was as follows:

1. Cut a strip of insulative cellular polypropylene-based material along the cross direction (CD) and machine direction (MD).
2. Hold the material with a flat clamp and use a razor blade to perform a fine shave.
3. Focus the microscope at 100× and adjust lighting onto the material.
4. Perform length and width measurements of each unique cell in the CD and MD orientation and record values (see, FIG. 1.
5. Count the number of measured unique cells and record the values (see, FIG. 1).
6. Perform cell wall thickness measurements across 3-4 tangent lines to overall length of each unique cell in the CD and MD orientation and record the values (see, FIG. 2).
7. Perform three overall strip thickness measurements starting from the bottom of the first measured cell group, to the middle of the cell group, to the top of the cell group (see, FIG. 3).
8. Perform an overall length measurement starting from the lowest complete cell to the highest complete cell (see, FIG. 3).
9. Move microscope visual field so the bottom of the most upper incomplete cell is touching the bottom of the screen.
10. Repeat steps 4-9 on each new unique cell until about 0.200" to 0.800" of the strip is measured. Ensure that the overall length and cell composition does not overlap. Each overall length measurement after the first measurement is taken from the top of the previous highest complete cell to the top of the current highest complete cell.

A sheet of insulative cellular polypropylene-based material produced as described herein typically possessed a density of about 0.1615 g/cm$^3$ and material thickness of about 0.066 inches (1.6764 mm).

Example 2: Test Analysis

All cell measurements were performed on over 7500 unique cell units from 50 different samples produced in various ways as described above. Although the maximum window view range of the Keyence digital microscope was 100 mils by 100 mils, careful attention was paid to ensure that each cell was unique and that the overall height and width of the measured strip was an average of values. A total of six (6) different dimensional parameters were measured for iterations 1-18. In one exemplary embodiment, dimensional parameters of overall strip length (L), overall strip thickness (T), and total numbers of cells in the measured strip area (n) may be classified as bulk properties because they describe an overall cell property. In another exemplary embodiment, dimensional parameters of cell length (l), cell width (w), and cell wall thickness (t) may be classified as cell properties because they describe each cell unit. A total of five (5) different dimensional parameters were measured for iterations 19-50. In one exemplary embodiment, dimensional parameters of overall strip length (L), overall strip thickness (T), and total numbers of cells in the measured strip area (n) may be classified as bulk properties because they describe an overall cell property. In another exemplary embodiment, dimensional parameters of cell length (l) and cell width (w) may be classified as cell properties because they describe each cell unit. Each set of dimensional values was separately analyzed to ascertain a correlation between bulk properties and cell properties. Cell density (p) was used to normalize each cell number value because each of the 50 iterations possessed a different number of cells per area (cells/m$^2$) due to different strip geometries. Cell density is calculated as the total number of cells in a given strip (n) divided by the overall strip length (L) and overall strip thickness (T), raised to the 3/2 power, as shown in Equation 1. Cell aspect ratio (A) is calculated as the average cell length (l) divided by the average cell width (w) of given iterations, as shown in Equation 2.

$$p = (n/TL)^{3/2} \quad \text{Equation 1}$$

$$A = (l/w) \quad \text{Equation 2}$$

Equation 1 transforms the units from cells per unit area (cells/in$^2$) into cells per unit volume (cells/in$^3$). Through mathematical manipulation of the denominator, the area (m$^2$) is raised to the 3/2 power to transform the dimensional property into volume with correct units (m$^3$). The same correlative effect is applied to the number of cells for consistency. Therefore, cell density is independently measured and calculated from the average bulk properties, as shown in Table 4 and Table 5. Cell properties such as cell length, cell width, and cell wall thickness are also independently measured and the average is calculated, also as shown in Table 4 and Table 5. By comparing independent values, quantitative correlations can be established to predict the occurrence of wrinkle-resistant material based solely on comparison of independent variables.

TABLE 4

Test Analysis Data From Iterations 1-18

| Iteration # | Number of Cells in Strip (cells) | Strip Length (mils) | Strip Thickness (mils) | Cell Density (cells/in$^3$) | Cell Length (Mils) | Cell Width (Mils) | Cell Wall Thickness (Mils) | Cell Aspect Ratio |
|---|---|---|---|---|---|---|---|---|
| 1 | 265 | 654.48 | 59.05 | 5.68 × 10$^5$ | 14.22 | 7.33 | 0.96 | 1.94 |
| 2 | 101 | 521.43 | 84.41 | 1.10 × 10$^5$ | 34.28 | 10.87 | 1.83 | 3.15 |
| 3 | 398 | 693.10 | 60.79 | 9.18 × 10$^5$ | 11.94 | 6.70 | 0.78 | 1.78 |
| 4 | 290 | 635.96 | 68.79 | 5.40 × 10$^5$ | 19.78 | 6.56 | 0.93 | 3.02 |
| 5 | 500 | 759.73 | 70.83 | 8.96 × 10$^5$ | 16.43 | 5.30 | 0.84 | 3.10 |
| 6 | 457 | 692.33 | 69.96 | 9.16 × 10$^5$ | 17.01 | 5.22 | 0.77 | 3.26 |
| 7 | 281 | 752.03 | 66.41 | 4.22 × 10$^5$ | 18.45 | 8.28 | 0.96 | 2.23 |
| 8 | 276 | 754.69 | 69.28 | 3.84 × 10$^5$ | 19.54 | 8.53 | 1.02 | 2.29 |
| 9 | 402 | 833.86 | 62.49 | 6.78 × 10$^5$ | 8.09 | 5.92 | 0.88 | 1.37 |
| 10 | 421 | 833.37 | 70.72 | 6.04 × 10$^5$ | 9.99 | 6.17 | 0.9 | 1.62 |
| 11 | 39 | 828.50 | 50.75 | 2.82 × 10$^4$ | 60.77 | 14.81 | 2.40 | 4.10 |
| 12 | 53 | 807.00 | 55.43 | 4.08 × 10$^4$ | 51.27 | 12.85 | 2.75 | 3.99 |
| 13 | 37 | 931.48 | 55.28 | 2.28 × 10$^4$ | 68.52 | 16.36 | 2.27 | 4.19 |
| 14 | 29 | 802.19 | 58.33 | 1.54 × 10$^4$ | 70.44 | 20.80 | 3.12 | 3.39 |
| 15 | 21 | 817.08 | 64.75 | 7.91 × 10$^3$ | 86.75 | 24.36 | 3.43 | 3.56 |
| 16 | 36 | 830.59 | 77.76 | 1.32 × 10$^4$ | 65.06 | 19.97 | 2.63 | 3.26 |
| 17 | 31 | 825.61 | 64.22 | 1.41 × 10$^4$ | 65.00 | 22.00 | 2.99 | 2.95 |
| 18 | 28 | 832.65 | 61.00 | 1.29 × 10$^4$ | 63.30 | 20.71 | 3.56 | 3.06 |

TABLE 5

Test Analysis Data from Iterations 19-50

| Iteration # | Cell Length | Cell Width | Cell Density | Cell Aspect Ratio |
|---|---|---|---|---|
| 19 | 14.73 | 5.60 | 6.007E+05 | 2.63 |
| 20 | 20.72 | 7.16 | 4.407E+05 | 2.89 |
| 21 | 22.04 | 5.92 | 4.791E+05 | 3.72 |
| 22 | 17.95 | 5.95 | 6.545E+05 | 3.02 |
| 23 | 18.41 | 6.20 | 5.602E+05 | 2.97 |
| 24 | 17.02 | 5.93 | 910587 | 2.87 |
| 25 | 17.48 | 5.29 | 971383 | 3.30 |
| 26 | 13.04 | 5.92 | 1230737 | 2.20 |
| 27 | 13.97 | 6.34 | 1260693 | 2.20 |
| 28 | 13.08 | 6.6 | 1420564 | 1.98 |
| 29 | 18.1 | 5.45 | 1099014 | 3.32 |
| 30 | 20.74 | 6.53 | 728556 | 3.18 |
| 31 | 13.2 | 6.45 | 1167341 | 2.05 |
| 32 | 11.72 | 5.87 | 1851158 | 2.00 |
| 33 | 16.08 | 5.48 | 1179837 | 2.93 |
| 34 | 25.03 | 6.35 | 683270 | 3.94 |
| 35 | 14.02 | 6.05 | 1215786 | 2.32 |
| 36 | 11.54 | 5.94 | 1544317 | 1.94 |
| 37 | 10.59 | 5.46 | 1630729 | 1.94 |
| 38 | 10.71 | 5.52 | 1650454 | 1.94 |
| 39 | 10.78 | 6.1 | 1713915 | 1.77 |
| 40 | 16.14 | 5.43 | 1061618 | 2.97 |
| 41 | 19 | 5 | 911612 | 3.80 |
| 42 | 17.07 | 5.26 | 1159422 | 3.25 |
| 43 | 20.36 | 5.61 | 933041 | 3.63 |
| 44 | 14.81 | 6.51 | 1006006 | 2.27 |
| 45 | 12.57 | 6.05 | 1405602 | 2.08 |
| 46 | 12.99 | 6.38 | 1345104 | 2.04 |
| 47 | 13.5 | 6.03 | 1355593 | 2.24 |
| 48 | 21.82 | 6.69 | 751112.4 | 3.26 |
| 49 | 15.74 | 5.24 | 1005240 | 3.00 |
| 50 | 11.07 | 5.31 | 1962021 | 2.08 |

Example 2: Test Results

By correlating cell density bulk property to cell length, cell width, and cell wall thickness cell properties, a strong correlation was found that may predict dimensional properties with respect to cell density, and subsequently cell area. The coefficient of determination (R$^2$) values produced by Microsoft Excel 2010 power law regression fit demonstrates a high degree of accuracy with regard to the validity of the fitted power law-based model. The power law has an equation form of two dependent variables, x and y, and two independent variables or constants, A and K, as shown in Equation 3 and Equation 4:

$$y=Ax^K \quad \text{Equation 3}$$

$$x=(y/A)^{1/K} \quad \text{Equation 4}$$

Figure 12:
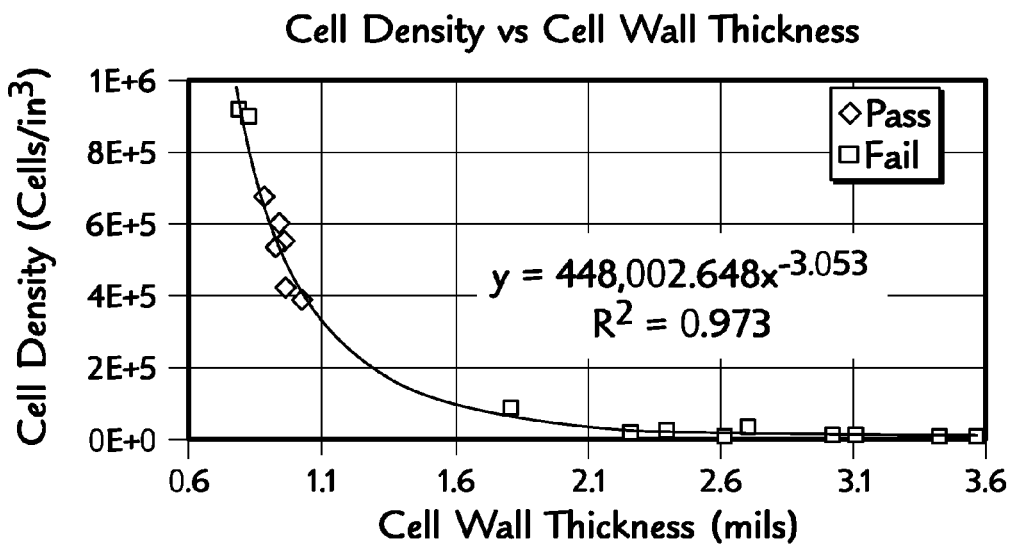
FIG. 12 is a graph with a power law regression fit of cell density vs. cell wall thickness in an x-y plot for insulative cellular polypropylene-based materials of the present disclosure where the power law equation for predicting cell wall thickness with respect to cell density is $y=448,002.648x^{-3.053}$ and $R^2=0.973$.
Figure 13:
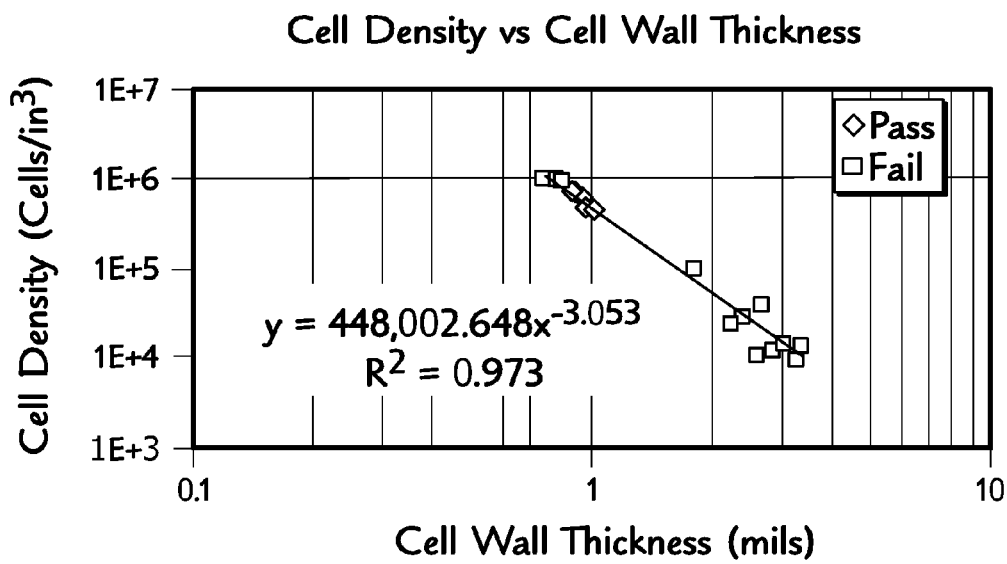
FIG. 13 is a graph with a power law regression fit of cell density vs. cell wall thickness in a log-log plot for insulative cellular polypropylene-based materials of the present disclosure where the power law equation for predicting cell wall thickness with respect to cell density is $y=448,002.648x^{-3.053}$ and $R^2=0.973$.
Figure 14:
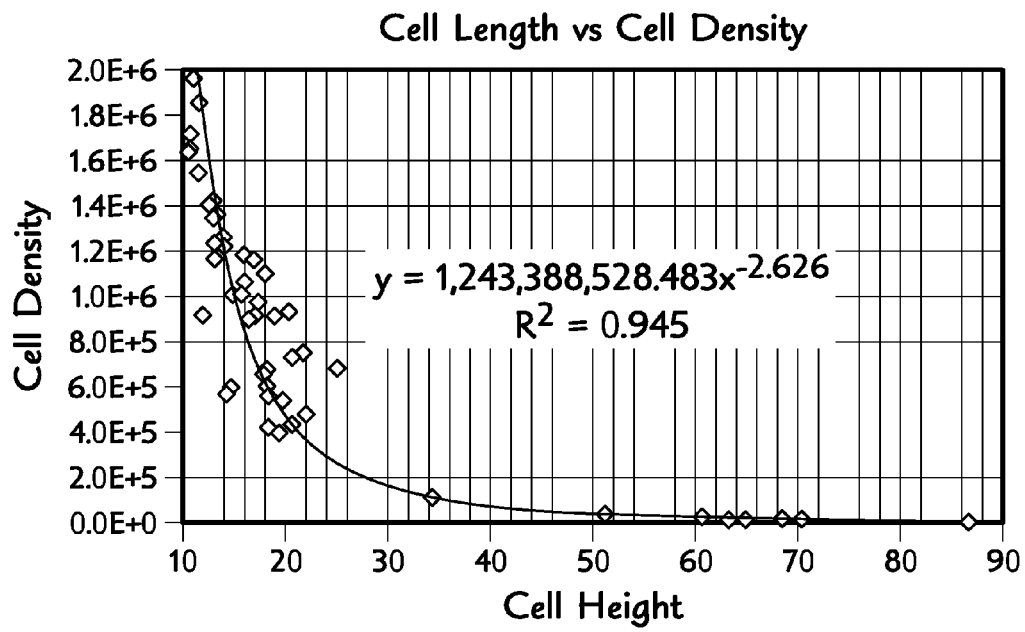
FIG. 14 is a graph with a power law regression fit of cell density vs. cell length in an x-y plot for insulative cellular polypropylene-based materials of the present disclosure where the power law equation for predicting cell length with respect to cell density is $y=1,243,388,528.484x^{-2.626}$ and $R^2=0.945$.
Figure 15:
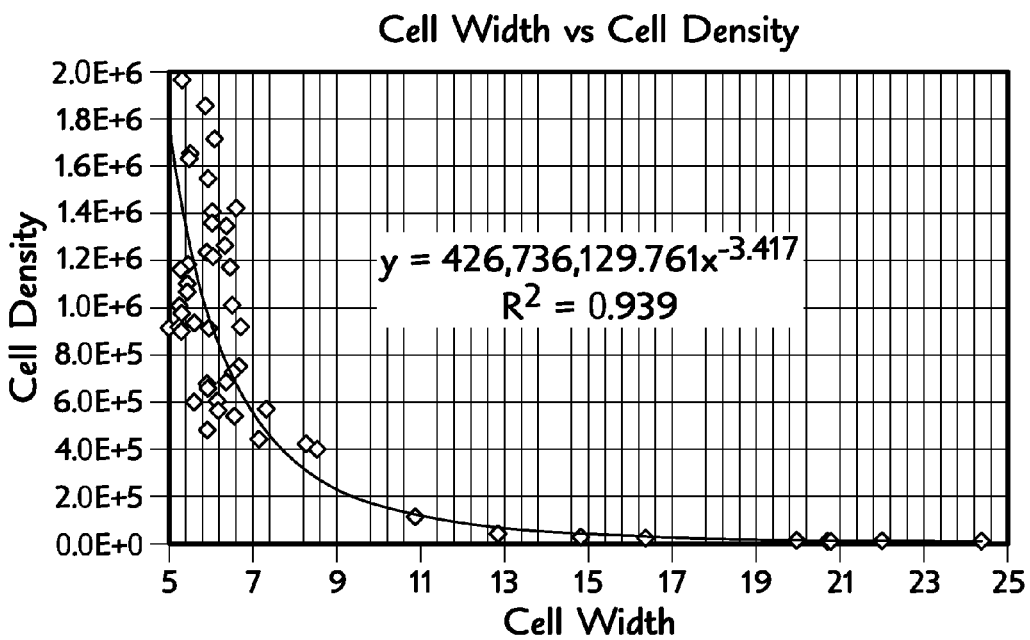
FIG. 15 is a graph with a power law regression fit of cell density vs. cell width in an x-y plot for insulative cellular polypropylene-based materials of the present disclosure where the power law equation for predicting cell width with respect to cell density is $y=426,736,129.761x^{-3.417}$ and $R^2=0.939$.

In exemplary embodiments, cell density may predict cell length, cell width, and cell wall thickness with $R^2$ values of 0.945, 0.939, and 0.973 (see, FIG. 14, FIG. 15 and FIG. 12, respectively). The closer the $R^2$ value is to 1, the more accurate the model fit. It is generally accepted that a regression fit value greater than 0.85 demonstrates a strong quantitative correlation between two independent variables, which, in this case, are represented by bulk properties and cell properties.

In exemplary embodiments, the equation for predicting cell length with respect to cell density may be $y=1,243,388,528.483x^{-2.626}$, wherein the power law constants for predicting cell length with respect to cell density are $A=1,243,388,528.483$ and $K=-2.626$. In other exemplary embodiments, the equation for predicting cell width with respect to cell density may be $y=426,736,129.761x^{-3.417}$, wherein the power law constants for predicting cell width with respect to cell density are $A=426,736,129.761$ and $K=-3.417$. In other exemplary embodiments, the equation for predicting cell wall thickness with respect to cell density may be $y=448,002.648x^{-3.053}$, wherein the power law constants for predicting cell wall thickness with respect to cell density are $A=448,002.648$ and $K=-3.053$.

Figure 16:
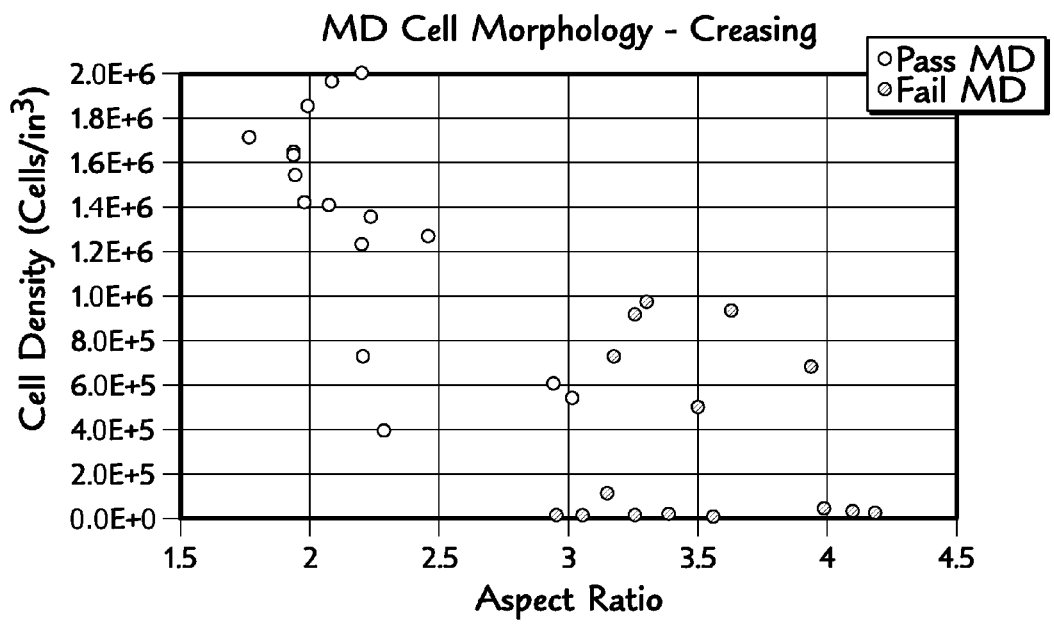
FIG. 16 is an x-y plot of cell density vs. machine direction (MD) cell aspect ratio illustrating the effect of MD cell morphology on creasing.
Figure 17:
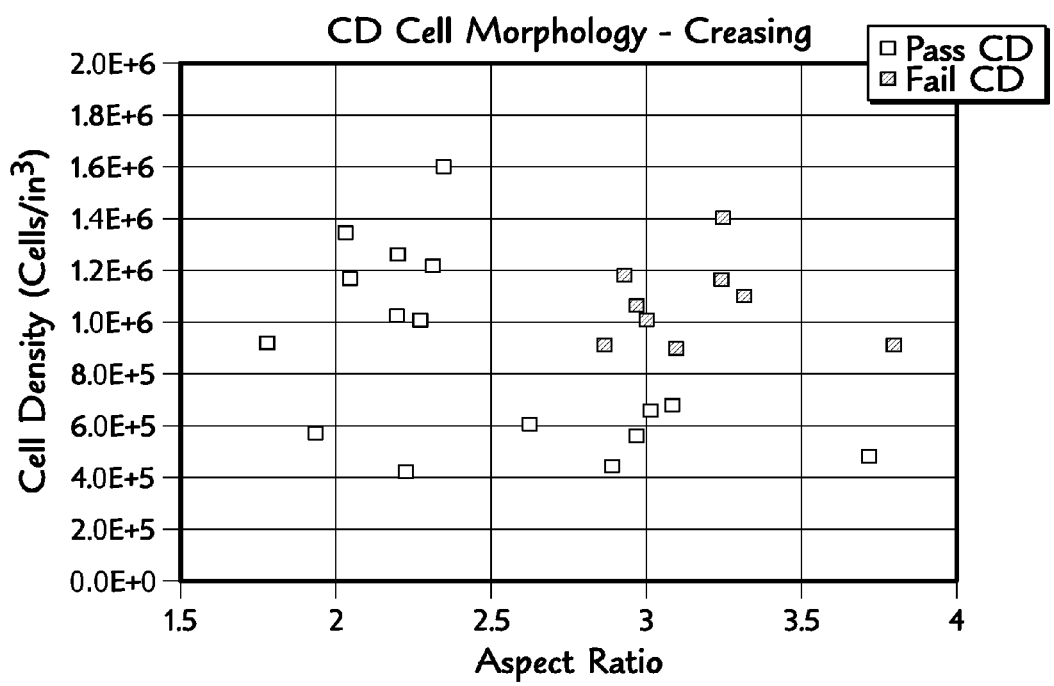
FIG. 17 is an x-y plot of cell density vs. cross direction (CD) cell aspect ratio illustrating the effect of CD cell morphology on creasing.

The data also illustrate a satisfactory range where insulative cellular polypropylene-based material possesses wrinkle resistance or lacks wrinkles altogether, as defined by Pass and Fail, where Pass means wrinkles and/or creases are not present and Fails means wrinkles and/or creases are present. As shown in FIG. 16 and FIG. 17, the data can be organized in both the machine direction and cross-web direction. From interpretation of the data in FIG. 16, it can be seen that the aspect ratio of cells that run parallel to the circumference (i.e., in the MD, machine direction) may not only play an important role in determining wrinkle resistance, but a more important role than that of either cell density or the aspect ratio of cells running perpendicular to the circumference (i.e., in the CD, cross direction, as shown in FIG. 17).

In exemplary embodiments (see, FIG. 16), insulative cellular polypropylene-based material that possesses a cell aspect ratio in the MD direction of less than about 2.75 may not wrinkle when convoluted into an article, such as an insulative cup. Illustratively, insulative cellular polypropylene-based material that possesses a cell aspect ratio in the MD direction of 2.5 or less may not wrinkle when convoluted into an article, such as an insulative cup. In other exemplary embodiments (see, FIG. 17), insulative cellular polypropylene-based material that possesses a cell aspect ratio in the CD direction of less than about 2.75 may not wrinkle when convoluted into an article, such as an insulative cup. Illustratively, insulative cellular polypropylene-based material that possesses a cell aspect ratio in the CD direction of 2.5 or less may not wrinkle when convoluted into an article, such as an insulative cup. In other exemplary embodiments (see, FIG. 17), insulative cellular polypropylene-based material that possesses a cell aspect ratio in the CD direction of about 2.75 to about 4.00 and a cell density of about 300,000 cells/in³ to about 900,000 cells/in³ may not wrinkle when convoluted into an article, such as an insulative cup. In other exemplary embodiments (see, FIG. 16), insulative cellular polypropylene-based material that possesses a cell aspect ratio in the MD direction of about 2.75 to about 3.5 and a cell density of about 300,000 cells/in³ to about 700,000 cells/in³ may not wrinkle when convoluted into an article, such as an insulative cup.

The cell prediction model accurately describes cell growth in the cell width, cell length, and cell wall thickness category and possesses power law functionality, similarly to that seen in many natural phenomena. By taking on a log-log plot form, the correlation is unexpectedly a straight line that penetrates near or through all data points with accuracy. This development provides further evidence for power law correlation and subsequently the ability to model and predict cell growth, as shown in FIGS. 8-13.

As presaged by the wrinkle-resistant versus micro-creasing/macro-creasing results shown in FIG. 4-7, and as summarily illustrated in FIG. 16 and FIG. 17, the present disclosure permits the identification of a control range with respect to cell aspect ratio and cell density, which range permits the manufacture of insulative cups that do not wrinkle and/or crease. FIG. 16 illustrates cell densities in a (cup) convolution process as a function of cell aspect ratio in the machine direction, whereas FIG. 17 illustrates cell densities in a (cup) convolution process as a function of cell aspect ratio in the cross direction. In FIG. 16 and FIG. 17, cell densities that Pass are tolerated without the onset of wrinkling and/or creasing during cup convolution. Conversely, cell densities in FIG. 16 and FIG. 17 that are associated with wrinkling and/or creasing during cup convolution, i.e., that Fail, result in micro-creasing and/or macro-creasing, where micro-creasing and/or macro-creasing are defined as follows:

Micro-Creasing defines small creases inside the cup found in the middle, top, and especially bottom areas; they are generally ¼" to ½" in length and near invisible to the eye unless you look for them.

Macro-Creasing defines large creases inside the cup that run all the way from the bottom to top or tangent to the cup; they are generally cup-length and very visible to the eye.

Although only a number of exemplary embodiments of the present disclosure have been described in detail above, those skilled in the art will readily appreciate that many modifications are possible in the exemplary embodiments without materially departing from the novel teachings and advantages. Accordingly, all such modifications are intended to be included within the scope of this disclosure as defined in the following claims.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and prepare the disclosed materials. These and other components are disclosed herein, and it is understood when combinations, subsets, interactions, groups, etc. of these components are disclosed that while specific reference of each various individual and collective combinations and permutation of these may not be explicitly disclosed, each is specifically contemplated and described herein, for all methods and materials. This applies to all aspects of this application including, but not limited to, steps in disclosed methods. Thus, if there are a variety of additional steps that can be performed, it is understood that each of these additional steps can be performed with any specific embodiment or combination of embodiments of the disclosed methods.

It will be apparent to those skilled in the art that various modifications and variations can be made without departing from the scope or spirit of the present disclosure. Other embodiments will be apparent to those skilled in the art from consideration of the specification and practice disclosed herein. It is intended that the specification and examples be considered as exemplary only.

The invention claimed is:

1. An insulative cellular polypropylene-based extruded material comprising i) a first polymer material comprising at least one high melt strength polypropylene homopolymer,
   ii) a second polymer material comprising at least one polymer selected from the group consisting of crystalline polypropylene homopolymer, impact polypropylene copolymer, and mixtures thereof,
   iii) at least one nucleating agent, and
   iv) at least one slip agent,
   wherein the extruded material has a cell aspect ratio in a cross direction of about 2.75 to about 3.75, a cell density of about 800,000 cells/in$^3$ and wherein the extruded material extruded through an extruder die lip at a die exit angle of 20° to 60° lacks surface indentations of greater than 5 microns when a sheet of the extruded material is curved to form a round article.

2. A micro-creasing or macro-creasing insulative cellular polypropylene-based extruded material having a cell density of about 700,000 cells/in$^3$ to about 2,000,000 cells/in$^3$ and a cell aspect ratio in a machine direction of about 2.75 to about 4.5, and
   wherein the extruded material extruded through an extruder die lip at a die exit angle of 20° to 60° lacks surface indentations of greater than 5 microns when a sheet of the extruded material is curved to form a round article.

3. The micro-creasing or macro-creasing insulative cellular polypropylene-based extruded material of claim 2, wherein the cell density is about 900,000 cells/in$^3$ to about 2,000,000 cells/in$^3$ and the cell aspect ratio in a cross direction is about 2.75 to about 4.5.

* * * * *